United States Patent
Adogla et al.

(10) Patent No.: US 11,861,373 B2
(45) Date of Patent: Jan. 2, 2024

(54) TECHNIQUES FOR PROVIDING CLOUD SERVICES ON DEMAND

(71) Applicant: Oracle International Corporation, Redwood Shores, CA (US)

(72) Inventors: Eden Grail Adogla, Seattle, WA (US); Matthew Victor Rushton, Portsmouth, NH (US); Iliya Roitburg, Seattle, WA (US); Brijesh Singh, Mercer Island, WA (US)

(73) Assignee: Oracle International Corporation, Redwood Shores (CA)

( * ) Notice: Subject to any disclaimer, the term of this patent is extended or adjusted under 35 U.S.C. 154(b) by 251 days.

(21) Appl. No.: 17/494,533

(22) Filed: Oct. 5, 2021

(65) Prior Publication Data
US 2023/0108661 A1  Apr. 6, 2023

(51) Int. Cl.
*G06F 9/44* (2018.01)
*G06F 9/4401* (2018.01)
(Continued)

(52) U.S. Cl.
CPC .............. *G06F 9/4416* (2013.01); *G06F 8/61* (2013.01); *H04L 67/1031* (2013.01); *H04L 67/51* (2022.05); *H04L 67/63* (2022.05)

(58) Field of Classification Search
CPC ......... G06F 9/4416; G06F 8/61; H04L 67/51; H04L 67/63; H04L 67/1031
See application file for complete search history.

(56) References Cited

U.S. PATENT DOCUMENTS 10,917,358 B1 * 2/2021 Herle ...................... G06F 9/485
2014/0075021 A1 * 3/2014 Revanuru ........... H04L 41/5041
709/224
(Continued)

FOREIGN PATENT DOCUMENTS

WO      2021150435 A1    7/2021
WO   WO-2021150435 A1 *  7/2021   .......... G06F 11/0757

OTHER PUBLICATIONS

International Application No. PCT/US2022/023715, International Search Report and Written Opinion dated Jul. 13, 2022, 14 pages.

*Primary Examiner* — Zahid Choudhury
(74) *Attorney, Agent, or Firm* — Kilpatrick Townsend & Stockton LLP

(57) ABSTRACT

Techniques are disclosed for deploying a computing resource (e.g., a service) in response to user input. A computer-implemented method can include operations of receiving (e.g., by a gateway computer of a cloud-computing environment) a request comprising an identifier for a computing component of the cloud-computing environment. The computing device receiving the request may determine whether the identifier exists in a routing table that is accessible to the computing device. If so, the request may be forwarded to the computing component. If not, the device may transmit an error code (e.g., to the user device that initiated the request) indicating the computing component is unavailable and a bootstrap request to a deployment orchestrator that is configured to deploy the requested computing component. Once deployed, the computing component may be added to a routing table such that subsequent requests can be properly routed to and processed by the computing component.

20 Claims, 17 Drawing Sheets

(51) Int. Cl.
  *H04L 67/51* (2022.01)
  *H04L 67/63* (2022.01)
  *G06F 8/61* (2018.01)
  *H04L 67/1031* (2022.01)

(56) References Cited

U.S. PATENT DOCUMENTS

2014/0075239 A1   3/2014  Prathipati et al.
2019/0050213 A1*  2/2019  Schanafelt ............ G06F 9/5072
2020/0389393 A1* 12/2020  Bosch .................... H04L 63/20

* cited by examiner

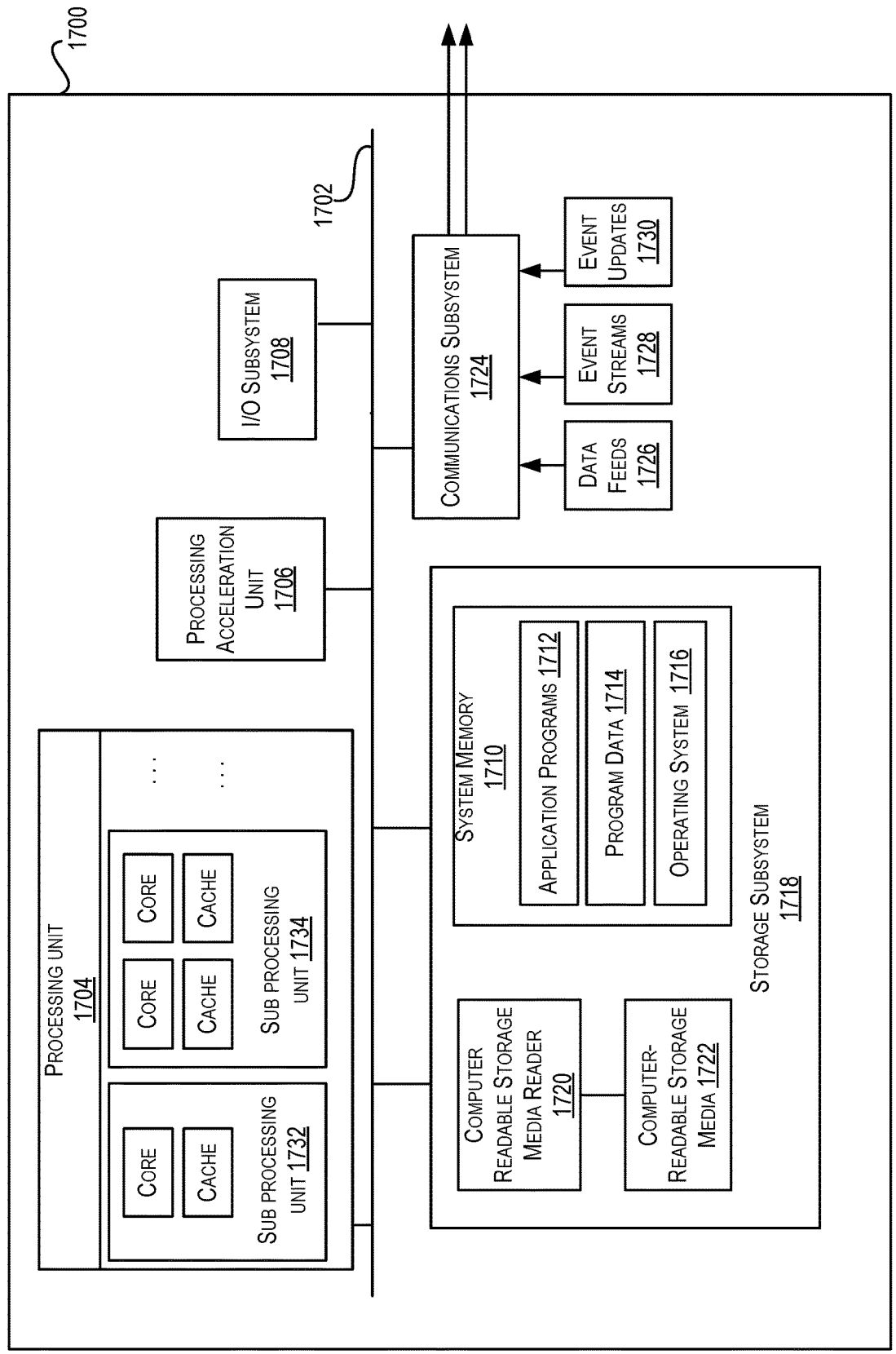

TECHNIQUES FOR PROVIDING CLOUD SERVICES ON DEMAND

BACKGROUND

In today's cloud-computing environments, a predefined set of cloud services may be deployed to a given region. It is not guaranteed that users of the region will utilize every service deployed. Deploying and maintaining a service that is not utilized can waste valuable resources of the cloud-computing environment. Additionally, it may be the case that the user may wish to utilize a service that was not initially deployed to that region. Currently, if a service call is made to a service that has not been deployed, an error code is returned and the user's request goes unprocessed. Additionally, the user may not have any control over the specific services deployed to that region. Modifications can be made with respect to the management and deployment of various services within a cloud-computing environment that improves user control and provides an overall improved user experience.

BRIEF SUMMARY

Embodiments of the present disclosure relate to providing the ability to deploy requested and/or ordered cloud computing resources (e.g., services) at run time. More particularly, some embodiments provide methods, computer-readable medium, and systems that implement functionality to receive requests for a previously un-deployed service, determine the service is not currently deployed, and request, via a cloud orchestration service, bootstrapping/deployment of the requested service. In some embodiments, a user interface may be provided at which a service may be explicitly ordered/requested. Utilizing the user interface, the ability to request bootstrap/deployment of a specific service (e.g., utilizing a cloud orchestration service) is provided.

One embodiment is directed to a method for deploying cloud computing resources. The method can include receiving, by a computing device of a cloud-computing environment, a request comprising an identifier for a computing component of the cloud-computing environment. The method can further include determining, by the computing device, whether the identifier exists in a routing table that is accessible to the computing device. The method may further include, in accordance with the identifier existing in the routing table, forward the request to the computing component. The method may further include, in accordance with the identifier being missing from the routing table: transmitting, by the computing device, an error code in response to the request, the error code indicating the computing component is unavailable, and transmitting, by the computing device to a deployment orchestrator of the cloud-computing environment, a bootstrap request corresponding to the computing component, the deployment orchestrator configured to deploy the computing component to the cloud-computing environment based at least in part on the bootstrap request. The method may further include receiving a subsequent request comprising the identifier. The method may further include transmitting the subsequent request to the computing component for processing.

Another embodiment is directed to another method for deploying cloud computing resources. The method may include identifying, by a computing device of a cloud-computing environment, a first set of computing components already deployed within the cloud-computing environment. The method may further include identifying, by the computing device, a second set of computing components available for deployment within the cloud-computing environment. The method may further include receiving, by the computing device, a request for deployment. In some embodiments, the request for deployment identifies a particular computing component of the second set of computing components available for deployment. The method may further include transmitting, by the computing device to a deployment orchestrator of the cloud-computing environment, a bootstrap request corresponding to the particular computing component requested. In some embodiments, the deployment orchestrator is configured to deploy the particular computing component to the cloud-computing environment based at least in part on the bootstrap request. The method may further include presenting a user interface that presents a first set of status indicators for the first set of computing components already deployed within the cloud-computing environment and a status indicator corresponding to the particular computing component.

In some embodiments, the method may further include identifying that the particular computing component was successfully deployed, adding an identifier associated with the particular computing component to a routing table, receiving a subsequent request comprising the identifier, and transmitting the subsequent request to the particular computing component for processing.

In some embodiments, transmitting the bootstrap request causes the deployment orchestrator to perform operations comprising (at least) 1) identifying one or more computing components from which the particular computing component depends and 2) deploying the one or more computing components prior to deploying the particular computing component.

In some embodiments, identifying the one or more computing components from which the particular computing component is based at least in part on determining the one or more computing components from a directed acyclic graph that defines computing component dependencies.

In some embodiments, the method may further include presenting, at the user interface, information identifying the one or more computing components from which the particular computing component requested depends, receiving, at the user interface, user input indicating acceptance of deploying the one or more computing components prior to deploying the particular computing component, and transmitting, by the computing device to the deployment orchestrator, respective bootstrap requests corresponding to the one or more computing components, wherein the respective bootstrap requests are transmitted prior to transmitting the bootstrap request corresponding to the particular computing component requested.

In some embodiments, the method may further include transmitting, to the deployment orchestrator, a spin-down request corresponding to the particular computing component, the spin-down request being transmitted in response to 1) receiving a subsequent request to spin down the particular computing component, or 2) identifying a last time at which a last request for the particular computing component was received and determining that a difference between the last time and a current time exceeds a predefined threshold period of time.

In some embodiments, transmitting the spin-down request is further based at least in part on determining that no other component of the cloud-computing environment depends on the particular computing component.

Another embodiment is directed to a computing device of a cloud-computing environment. In some embodiments, the computing device comprises one or more processors and one or more memories storing computer-executable instructions that, when executed by the one or more processors, causes the computing device to perform the operations of either or both of the methods described above.

Another embodiment is directed to a non-transitory computer readable storage medium that comprises computer-executable instructions that, when executed by one or more processors of a computing device, cause the computing device of a cloud-computing environment to perform the operations of either or both of the methods described above.

BRIEF DESCRIPTION OF THE DRAWINGS

To easily identify the discussion of any particular element or act, the most significant digit or digits in a reference number refer to the figure number in which that element is first introduced.

FIG. 17 is a block diagram illustrating an example computer system, according to at least one embodiment.

DETAILED DESCRIPTION

Figure 1:
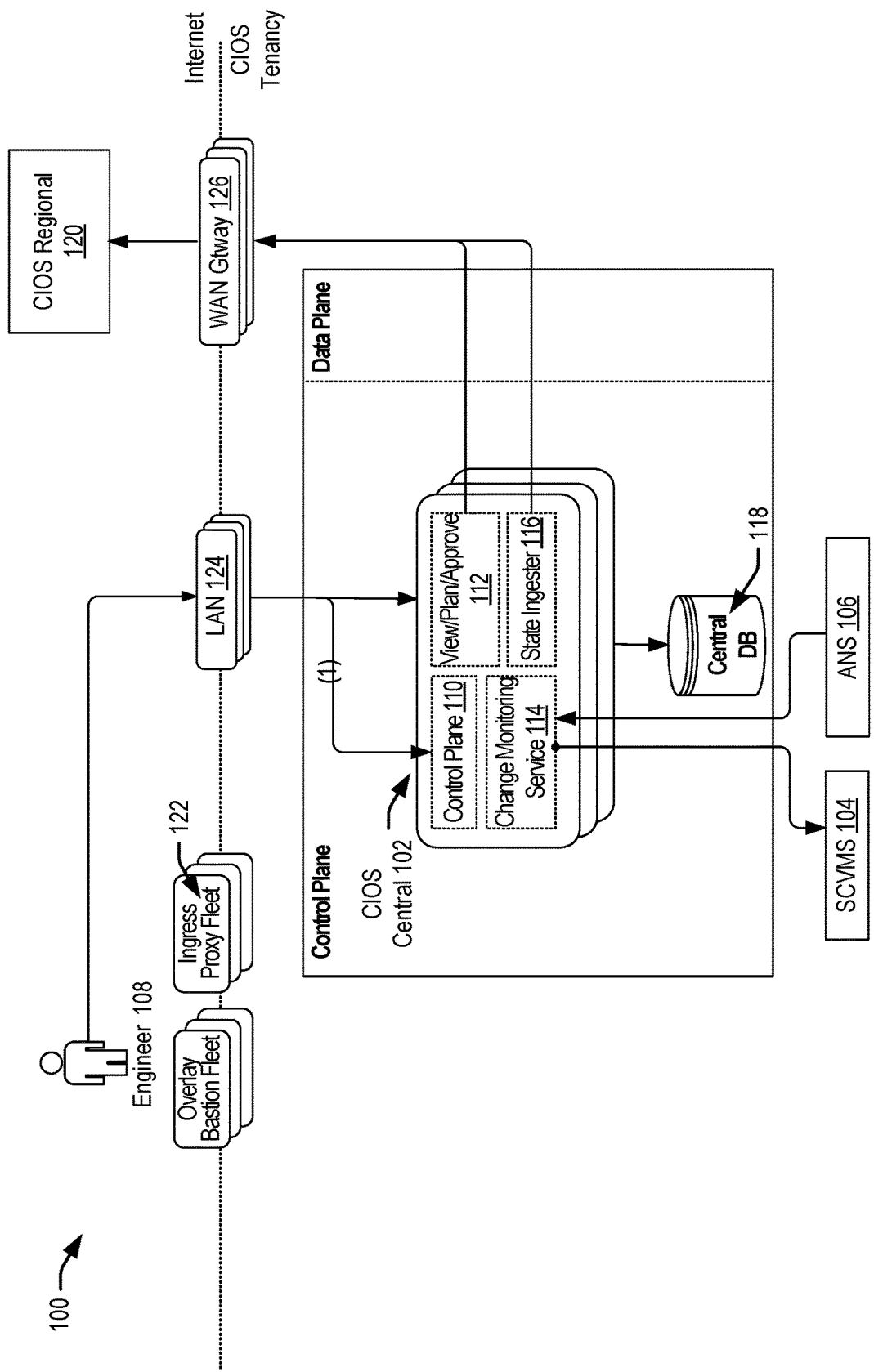
FIG. 1 is a block diagram of an architecture for implementing at least some elements of a cloud infrastructure orchestration service, according to at least one embodiment.

In some examples, infrastructure as a service (IaaS) is one particular type of cloud computing. IaaS can be configured to provide virtualized computing resources over a public network (e.g., the Internet). In some examples, IaaS is one of the three main categories (or sub-categories) of cloud computing services. Most consider the other main categories to be software as a service (SaaS) and platform as a service (PaaS), and sometimes SaaS may be considered a broader category, encompassing both PaaS and IaaS, with even some considering IaaS to be a sub-category of PaaS as well.

In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) in each VM, deploy middleware, such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some examples, IaaS deployment is the process of putting a new application, or a new version, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS may be used to provision an initial set of infrastructure components (e.g., services, etc.). In some embodiments, the infrastructure (e.g., what components are needed and how they interact) can be defined by one or more configuration files. An overall topology of the infrastructure (e.g., what resources depend on which, and how they each work together) can be described declaratively. In some instances, once the topology is defined, a workflow can be generated that creates and/or manages the different components described in the configuration files.

As noted above, one way to provision the infrastructure is to describe it declaratively. As such, the configuration file may be a declarative file that merely describes each of the infrastructure components noted above and how they interact. The configuration file can describe the resource and the relevant fields needed to create the element, and then as other elements can be described that reference the previously described elements. In some examples, a provisioning tool can then generate a workflow for creating and managing the elements that are described in the configuration file.

In some instances, the workflow of the provisioning tool may be configured to perform various commands. One function that can be performed is view reconciliation, where the provisioning tool can compare the view of the current infrastructure (e.g., the expected state of the infrastructure) with how the infrastructure is actually running. In some instances, performing the view reconciliation function may include querying various resource providers or infrastructure resources to identify what resources are actually running. Another function that the provisioning tool can perform is plan generation, where the provisioning tool can compare the actually running infrastructure components with what the provisioning tool wants the state to look like (e.g., the desired configuration). In other words, the plan generation function can determine what changes need to be made to bring the resources up to the most current expectations. In some instances, a third function is the execution (e.g., apply) function, where the provisioning tool can execute the plan generated by the plan generation function.

In general, provisioning tools may be configured take the configuration file, parse the declarative information included therein, and programmatically/automatically determine the order in which the resources need to be provisioned in order to execute the plan. For example, if a virtual private cloud (VPC) needs to be booted before security group rules and VMs are booted, then the provisioning tool will be able to make that determination and implement the booting in that order without user intervention and/or without that information necessarily being included in the configuration file.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

As noted above, generally there are two different tools used to handle each of the provisioning of infrastructure resources and the deployments of code to control the infrastructure resources, with orchestration between the two tools being performed manually. However, at scale, manual implementation always leads to deviations. Thus, an automated tool that can both provision and deploy a virtual infrastructure enables more efficient and reliable techniques for implementing a virtual cloud environment.

In some examples, when two tools are used, issues can arise when a user manually makes changes to the code between the provisioning phase and the deployment phase. As described herein, a technique that uses a single tool for both provisioning and deploying can alleviate that by automating the process, such that there isn't an opportunity for manual code changes. It may be the case, that a slight change to the way in which one user codes something, can create major issues in the deployment phase. In some examples, the first time an operator performs an action in a new region (e.g., a typo in the code), the object that was coded with the typo may be that way forever. If the application is deployed with that typo, and the application is not sensitive to that typo (e.g., it still works), it is possible that some time down the road, an additional code change could become sensitive to that typo, and crash the entire system. Thus, the techniques provided herein can remove the gap between provisioning and deployment that can often lead to problems.

In general, modeling deployments is declarative such that a configuration file can be used to declare the infrastructure resources. For example, create, read, update, delete (CRUD) instructions are generally used to generate deployment files using general Representational State Transfer (REST) concepts (e.g., REST Application Programming Interfaces (APIs)). However, deployment itself does not generally follow the same concept. Additionally, while the infrastructure provisioning tools tend to be really powerful and/or expressive, the tools for deployment tend to be much more restrictive regarding the operations they can perform (e.g., they are imperative as opposed to declarative). Thus, there has been a long-felt need for a tool that can handle both functional requirements (e.g., provisioning and deployment of infrastructure elements) within a cloud environment.

The embodiments disclosed herein may utilize a cloud infrastructure orchestration service (CIOS). This service can be configured to manage both provisioning and deploying of infrastructure assets within a cloud environment. In some instances, the CIOS can include two classes of service: the Central and Regional components (e.g., CIOS Central and CIOS Regional).

CIOS can be described as an orchestration layer that applies configuration to downstream systems (e.g., world-wide). It is designed to allow world-wide infrastructure provisioning and code deployment with no manual effort from service teams (e.g., beyond an initial approval in some instances). The high level responsibilities of CIOS include, but are not limited to:
  Providing teams with a view in to the current state of resources managed by CIOS, including any in-flight change activity.
  Helping teams plan and release new changes.
  Coordinating activity across various downstream systems within a region to execute approved release plans with no human intervention.
  Coordinating activity across regions/realms to execute approved release plans world-wide.
  Evolving the existing infrastructure (e.g., adding new services, changing services, removing services, etc.) once everything has been provisioned can be challenging. Conventionally, if a service that has not previously been provisioned is requested (e.g., via API call), the request would be rejected and the user would have no access to the service. Additionally, services that have gone unutilized (or at least underutilized according to some predefined threshold) may continue to run and waste resources even though the service (s) are not needed. To address these inadequacies, IaaS may be configured to identify implicitly when to add a new service and/or remove a service and may perform corresponding operations for deploying or winding down the service automatically. Additionally, or alternatively, IaaS may be configured with user interfaces from which a user may explicitly request the addition or removal of a service, view the current status of various services, and the like. These techniques can provide improved control and an overall more seamless and less-frustrating user experience.

FIG. 1 is a block diagram of an architecture for implementing at least some elements of a cloud infrastructure orchestration service, according to at least one embodiment. For example, FIG. 1 depicts an architecture 100 for illustrating techniques for implementing CIOS Central 102. In some examples, CIOS Central 102 can be the service that handles operations at the level of a "Flock." A flock may be a model CIOS may use to encapsulate a control plane and all its components. A flock may be used to model ownership of and point at the infrastructure components. An infrastructure component may be a long-lived piece of infrastructure that supports running code (e.g., a deployment application, a load balancer, a domain name system (DNS) entry, an object storage bucket, etc.). A flock configuration file may be used to describe the set of all infrastructure components, artifacts, and deployment tasks associated with a single service. Each flock may have one flock configuration file (herein referred to as a "flock config"). Flock configs are checked in to source control. Flock configs are declarative and provide realm, region, availability domain (AD), and artifact versions as input. An artifact refers to code being deployed to a deployment application or a Kubernetes engine cluster, or configuration information (hereinafter, "config") being applied to an infrastructure component.

In some embodiments, CIOS Central 102 has a few responsibilities, including but not limited to:
  Serving as an authentication gateway for Flock metadata changes and release operations.
  Storing an authoritative mapping of Flock metadata to the deployment artifacts and CIOS repositories for the flock.
  Coordinating global Releases across Phases and Targets.
  Synchronization to enforce policies like "no more than one ongoing release to a Flock at a time."
  Detecting changes to Flock configuration (config) and artifacts, and triggering a release generation on such changes.

In some examples, a source code version-control management service (SCVMS) 104 can be configured to store authoritative Flock configuration and an artifact notification service (ANS) 106 can be subscribed to by CIOS Central 102, so that CIOS Central 102 can be informed of new artifact builds. The CIOS Central 102 can then map incoming changes against the affected flocks, and initiate release planning where desired. Additionally, in some examples, an artifact push service (APS) can be invoked by CIOS Central 102, before a release to a target, to ensure any artifacts required for a successful release are present in the target's region ahead of release.

In some examples, customers (e.g., engineers) 108 can call CIOS Central 102 to CRUD flocks and/or releases, and to view the status of ongoing CIOS activity. Flock management service 110 can include one or more API's to manipulate flocks, view/plan/approve service 112 can include CRUD API's to create and approve plans, and to view a central copy of the state of all CIOS-managed resources, change monitoring service 114 can watch SCVMS 104 for changes to flock config, and can receive notifications about changes to other artifacts from ANS 106, and state ingester service 116 can create copies of each regional state (e.g., a point-in-time snapshot of a state of regional resources) in CIOS Central database (DB) 118 so that view/plan/approve 112 can expose them. In some examples, the CIOS Central DB 118 can be a DB of flocks, plans, and state. Flock information can be authoritative; while everything else may be a stale copy of data from CIOS Regional 120. CIOS Central 102 may be configured to provide any suitable portion and/or number of user interfaces for presenting any suitable data related to a flock, a release, an infrastructure component, an artifact, or the like. In some embodiments, CIOS Central 102 may present via any suitable interface data related to one or more releases. A release may include any suitable combination of tasks related to one or more infrastructure components and/or one or more code changes to one or more applications (e.g., artifacts).

In some examples, engineer 108 can perform an API call for the flock management service 110 (e.g., through the ingress proxy fleet 122) to create a list of flocks. The protocol for making such an API call can be hypertext transport protocol secure (HTTPS) or the like. Relevant access control lists (ACLs) for this operation can include a local area network (LAN) 124 or other private connection. For example, CIOS may manage/control a network-connectivity alternative to using the public Internet for connecting a customer's on-premises data center or network with CIOS (e.g., a dedicated, leased, and/or private connection). Additionally, authentication and authorization (e.g., of the engineer 108) may be performed by a reservation system portal that allows users to manage machine infrastructure (e.g., reservation service). In some instances, CIOS Central 102 can store flock metadata, plans, and state in the Central DB 118, using Java database connectivity (JDBC) or the like. In some examples, ANS 106 can be configured to notify the change monitoring service 114 when new artifacts have been published. The ANS 106 may use HTTPS, and both authentication and authorization may be handled by a mutual transport layer security service. Additionally, in some instances, the change monitoring service 114 can poll the SCVMS 104 for flock configuration changes. This polling can be performed using secure shell (SSH) or other protocols. Authentication of the change monitoring service 114 may be handled by a CIOS system account and authorization may be handled by SCVMS 104.

In some examples, the engineer 108 can use the view/plan/approve service 112 to do one or more of the following operations. The engineer 108 can plan and/or approve by calling CIOS Central 102 to generate and approve plans. The engineer 108 can view by calling CIOS Central 102 to view the status of ongoing CIOS activity world-wide. Additionally, the engineer 108 can CIOS Central 102 to view a replica of the state of CIOS-managed resources world-wide. These API calls (or the like) can be performed via the HTTPS protocol or similar protocols. Additionally, relevant access control lists (ACLs) can be controlled by LAN 124, and both authentication and authorization can be handled by the reservation service. In some examples, the view/plan/approve service 112 can request planning and push plan approval to all regions of CIOS Regional 120 (e.g., using HTTPS or the like). Relevant ACLs can be controlled using a security list managed by the wide area network (WAN) gateway 126. Authentication can be handled by mutual transport layer security and authorization can be handled by various identity policies. Further, the state ingester service 116 can watch CIOS Regional 120 for job status or state changes, so that CIOS can provide a central view of them upon request (e.g., also using HTTPS or the like). ACLSs for this can also be handled by the WAN gateway 126, and both authentication and authorization can be handled by mutual transport layer security services.

Figure 2:
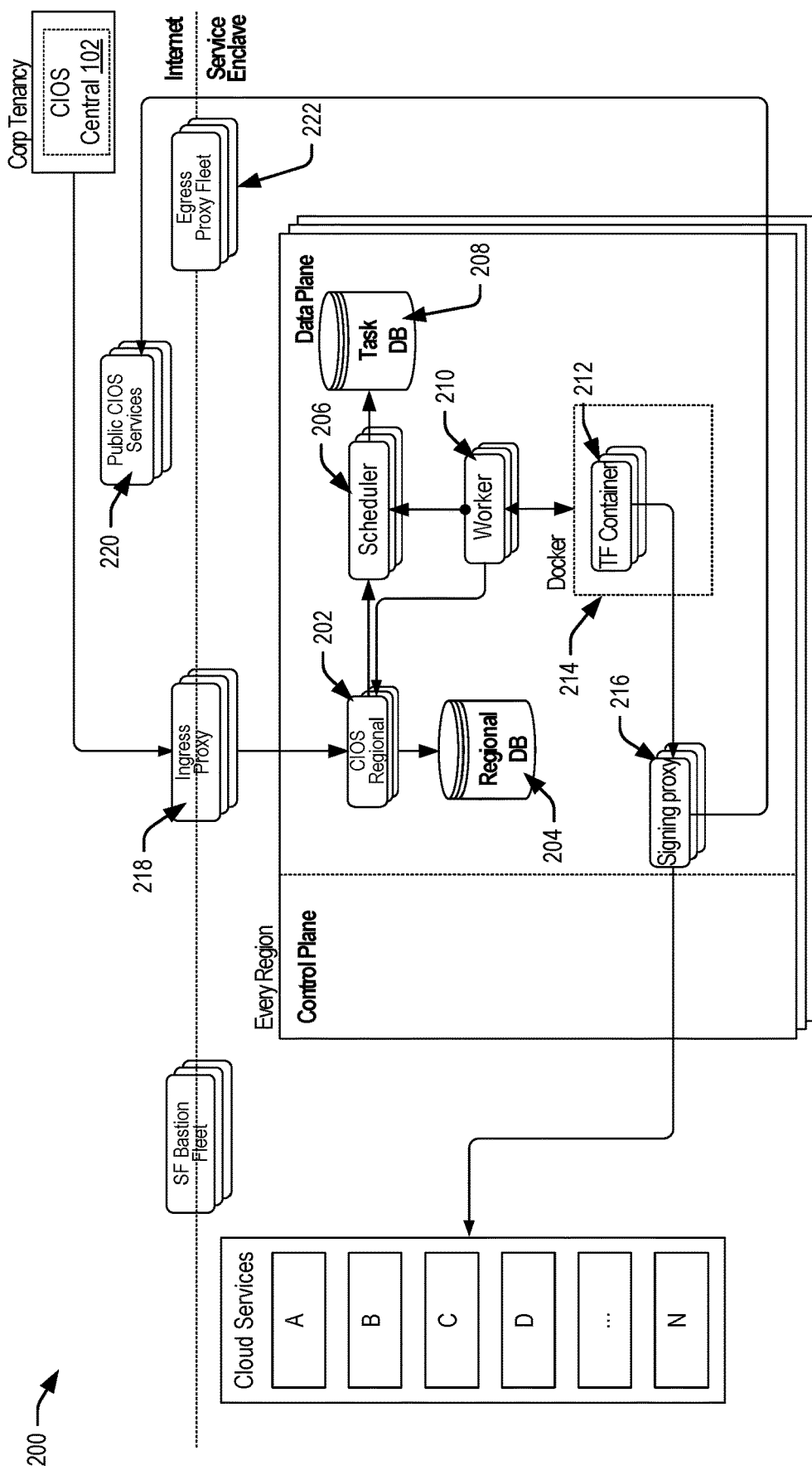
FIG. 2 is a block diagram of an architecture for implementing at least some elements of a cloud infrastructure orchestration service, according to at least one embodiment.

FIG. 2 depicts an architecture 200 for illustrating techniques for implementing at least CIOS Regional 202. In some examples, CIOS Regional 202 is where much of the work of declarative provisioning and planning, as well as approved release application can occur. In some instances, each instance of CIOS Regional 202 may have a regional fronted that can handle operations at the level of "Execution Targets." It can be configured to perform the following:

- Handling all CIOS Authentication for incoming operations from CIOS Central 102.
- Enforcing a rule that only one "execution" (plan/import resources/apply plan) can be ongoing for a given Execution target at a time.
- Managing binary artifact storage for declarative provisioning artifacts used for input and output during declarative infrastructure provisioning execution. Examples of input are declarative infrastructure provisioning configuration files and an input state file. Typical output is a final state file.
- Requesting work from and polls for results from the CIOS Executor for any given execution.

In some instances, the CIOS Frontend may be dependent on a CIOS Executor 206 (also referred to herein as a "scheduler"), which can handle the actual execution. The CIOS Executor, in some examples, operates at the level of "Execution," and it can:

- Track a pool of available Worker nodes
- Query incoming job requests, and assigns them to eligible workers as available
- Track worker status and Execution updates for reporting to clients
- Detect dead nodes via a leasing protocol, and can fail tasks assigned to dead nodes, depending on task status.
- Provide facilities to cancel/kill/pause/resume Executions, and can map those onto facilities to pass cancellation/kill/resumption info on to Worker nodes.

In some instances, the CIOS Executor can depend on CIOS Workers, which can assign tasks for execution to Workers, and provide a facility for Workers to update job progress. The worker service operates at the granularity of "Task." Each worker is an agent executing Tasks assigned to that worker and reporting Task status and output. Each worker can:

- Poll Executor Worker APIs for assigned work items, and take action to make the assigned state match its local state:
  - start containers for polls task items that do not exist locally
  - kill containers for locally running containers that have no corresponding assigned task item
- Report status for jobs
- Stage input and output for job container execution
- Launch and monitor declarative infrastructure provisioning containers for doing the real work of a Release for an Execution Target.

CIOS Workers may depend on CIOS Executor to poll work from and report results to the worker endpoint of the CIOS Executor. The Worker may rely on the Executor for all coordination. Additionally, the CIOS Workers may also depend on CIOS Regional 202, where the Worker services reads input from and writes output to one or more APIs that are associated with the Regional Frontend service. Examples of input are configuration and starting state files and import mappings. Examples of output are declarative provisioning process, output declarative provisioning state files, and import result states.

In some examples, CIOS Regional 202 can be a regional service for managing regional instances/deployments of CIOS. CIOS Regional 202 covers responsibility for authoritatively storing and managing plans and stat that pertains to a particular region. A Regional DB 204 may be a CIOS DB for the state and plans in the particular region. This is the authoritative copy of the region's subset of the Central DB 118 of FIG. 1. Scheduler 206 can be responsible for managing worker fleet capacity, assigning tasks to workers, and keeping track of task state. In some instances, Task DB 208 is another CIOS DB for task state. Data in this DB is mostly for operational purposes. Additionally, Worker 210 can be a fleet of java virtual machines (JVMs) that manage declarative provisioning images. These receive instructions from the Scheduler 206 and communicate results to both the Scheduler 206 and CIOS Regional 202. A CIOS container 212 can run declarative provisioning actions in its own private docker 214 container. This container does not need to contain secrets. Additionally, in some examples, a signing proxy 216 can be configured to prevent secret exfiltration via a declarative provisioning tool, in order to avoid putting secrets in the declarative provisioning Image. Instead, CIOS can perform request signing or initiate a mutual transport layer security (mTLS) service in a proxy. This also makes it easier to use FIPS-compliant crypto libraries.

In some examples, CIOS Central 102 can call CIOS Regional 202 to create plans, push approvals, watch job status, and extract declarative provisioner state (service principal). An ingress proxy 218 can be configured as the ACL and various identity policies may be used for both authentication and authorization. Alternatively, in some examples, the ingress proxy 218 may be replaced with a load balancer configured to balance the load incoming requests, plans, etc. In some instances, CIOS Regional 202 may run a declarative provisioner by asking the scheduler 206 to do so. Worker 210 can ask Scheduler 206 what it should be running, and can report status to Scheduler 206 when done. In some cases, mTLS may handle both authentication and authorization for CIOS Regional 202 and Worker 210. Additionally, when Worker 210 needs to run a declarative provisioner, it does so in docker containers by interacting with the local docker 214. Authentication for this stage may be handled by a local unix socket. A docker protocol may be used for this last step; however, HTTPS may be utilized for the previous ones.

In some embodiments, CIOS Regional 202 may be configured to provide any suitable portion and/or number of user interfaces for presenting any suitable data related to a flock, a release, an infrastructure component, an artifact, or the like. In some embodiments, CIOS Regional 202 may present via any suitable interface data related to one or more releases. A release may include any suitable combination of tasks related to one or more infrastructure components and/or one or more code changes to one or more applications (e.g., artifacts).

In some examples, the CIOS container 212 enables a declarative provisioner to interact (via API) with the signing proxy 216, while the declarative provisioner thinks it is calling various CIOS services. The signing proxy 216 listens on one ephemeral port per calling instance of declarative provisioner, known only to that declarative provisioner. The signing proxy 216 can initiate requests signatures or mTLS, and can pass the declarative provisioner's calls through to other CIOS services within the service enclave. In some instances, the signing proxy 216 can also communicate with one or more public CIOS services 220. For example, the Signing Proxy 216 will use the internal endpoint of public services where possible. For services with no internal endpoint, it must use the egress proxy 222 to reach the external endpoint. This use of the signing proxy 216 may not be for cross-region communication; for example, an egress proxy whitelist in each region may only be for that region's public IP ranges. In some examples, Worker 210 may then persist state and logs from a declarative provisioner in CIOS Regional 202 so that they can be exfiltrated to CIOS Central 102.

CIOS (or a declarative infrastructure provisioner such as the declarative provisioning tool of CIOS discussed above) may be utilized to parse the configuration file. Through this parse, CIOS (or the declarative provisioning provisioner) may generate a directed acyclic graph (DAG) for each resource, module, and/or capability that compiles and defines an ordered list of dependencies on other resources, modules, and/or capabilities. While attempting to deploy a resource, CIOS may traverse the DAG to identify when a resource is dependent on another resource, module, and/or capability of another resource. The DAG for each resource may specify implicit dependencies, explicit dependencies, or a combination thereof and may be used for booting or otherwise deploying the corresponding resource with CIOS.

Figure 3:
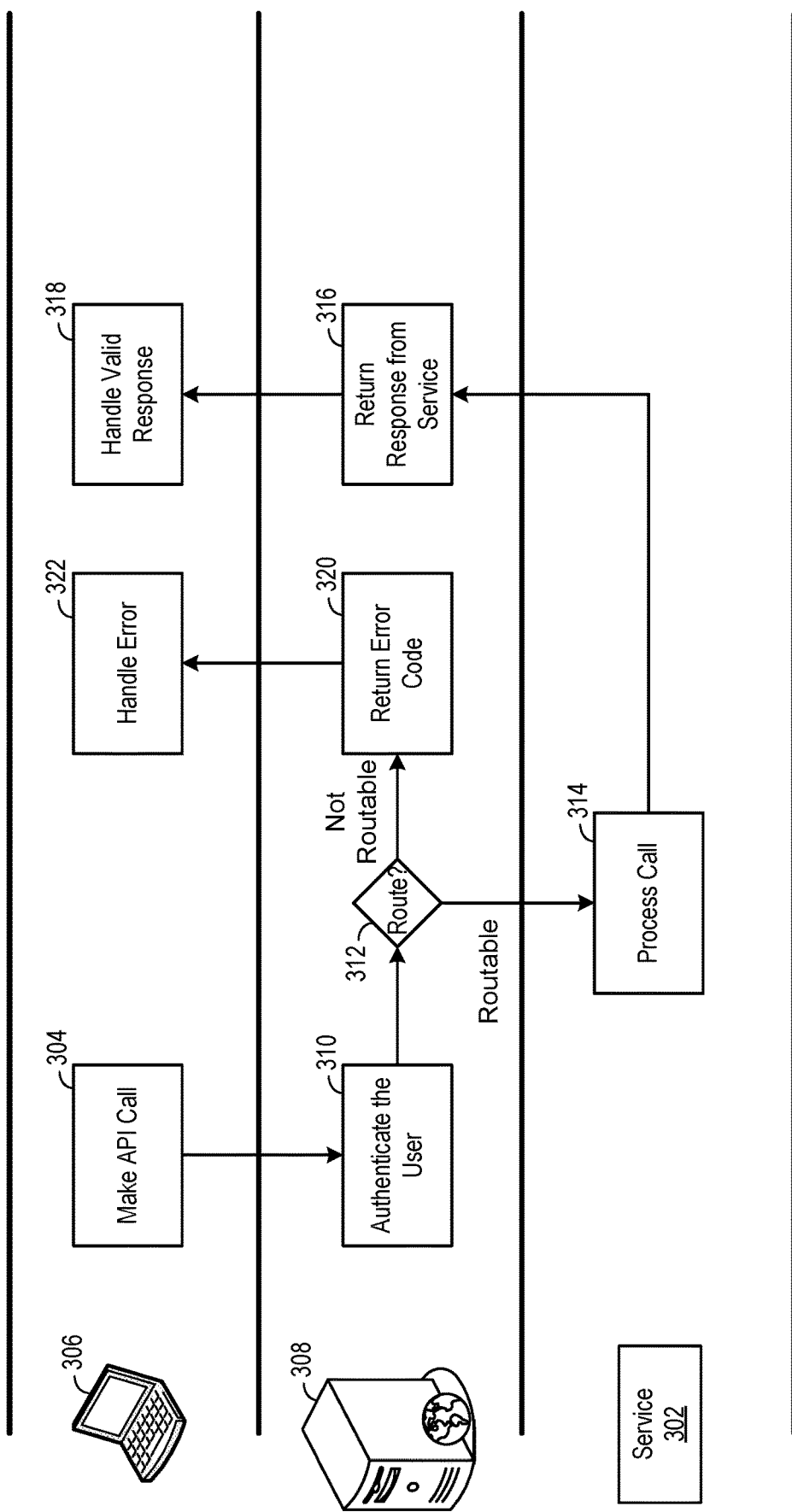
FIG. 3 is a flow diagram for illustrating a flow of operations performed in response to an application programming interface (API) call to a previously deployed service, in accordance with at least one embodiment.

FIG. 3 is a flow diagram for illustrating a flow 300 of operations performed in response to an application programming interface (API) call to a previously deployed service (e.g., service 302), in accordance with at least one embodiment. Service 302 may be one of a set of previously deployed services that have been deployed within a given region. The services discussed in the following figures are examples of a computing component of the cloud-computing environment of FIGS. 1 and 2. The same examples can be applied to other computing components (e.g., databases, object storage, block storage, virtual machines, etc.).

The flow 300 may begin at 304, where an API request may be made by user device 306. In some embodiments, the API can be performed via the HTTPS protocol or similar protocols. The request may include any suitable information such as an identifier of the user, an identifier for the service associated with the request, or the like. The API call may be received by gateway computer 308, which may be an example of a computer that implements the WAN gateway 126 of FIG. 1. The gateway computer 308 may be configured to maintain a routing table for previously deployed regional services (e.g., the cloud services A-N of FIG. 2). The routing table may include Internet Protocol (IP) addresses for each service and/or infrastructure component within the environments provided by the architectures of FIGS. 1 and 2. The routing table may contain any suitable information needed to forward a data packet along toward its destination. For example, the routing table may include a network identifier (e.g., an IP address) for the destination, a subnet mask that is used to match the destination IP address to the network ID, and any suitable information configured to enable the data packet to be forwarded to toward the destination.

At 310, the gateway computer 308 (or any suitable component of FIG. 2, such as ingress proxy 218, CIOS regional 202, or the like) may authenticate the user of the API call. In some embodiments, authentication may include making an API call to one or more services (e.g., an identity service) configured to maintain permissions and/or identity data for one or more users of the system. By way of example, the gateway computer 308 may call an identity service configured with permissions and/or identity data that may be utilized with the identifier of the user as received in the request to identify the user and/or one or more permissions policies associated with that user.

At 312, a determination may be made as to whether the API call is able to be routed. This determination may include any suitable combination of identifying 1) if the user is who they purport to be, 2) if the user has authorization to invoke such functionality of the service 302, or 3) if an identifier for the service (e.g., an IP address) is included in the current routing table maintained by the gateway computer 308. By way of example, if the identity of the user is known and/or the permissions associated with the user indicates the user has the authority to make that API call, and the identifier of the service 302 is included in the routing table maintained by the gateway computer 308, the gateway computer 308 may forward the request to the service 302. This forwarding may include identifying, from the routing table and a service identifier received in the message and associated with the service 302, the destination address associated with the service 302.

At 314, the service 302 may receive the API call and perform any suitable operations for processing the call. Once processing has completed, the service may return a response at 316 to the gateway computer 308. In some embodiments, this response may indicate whether the processing was successful (e.g., completed) or unsuccessful (e.g., incomplete/not allowed).

At 316, the user device 306 may receive the response and execute any suitable operations such as, but not limited to, displaying for the user an indication that the API call was successfully processed.

Alternatively, if at 312, a determination may be made by the gateway computer 308 (or another suitable component of FIG. 2) that the API is not routable. For example, if the user is not who they purport to be and/or the user does not have the authority to make such API calls and/or if an identifier for the service (e.g., an IP address) is not included in the current routing table maintained by the gateway computer 308, the gateway computer 308 (or other suitable component) may determine the API call is not routable and may forward a return error code (e.g., an alphanumeric value indicating a general or particular error) to the user device 306 at 320.

At 322, the user device 306 may be configured to perform one or more operations to handle the error such as displaying at the screen an indication of the error, enabling user options to attempt another request, etc.

Figure 4:
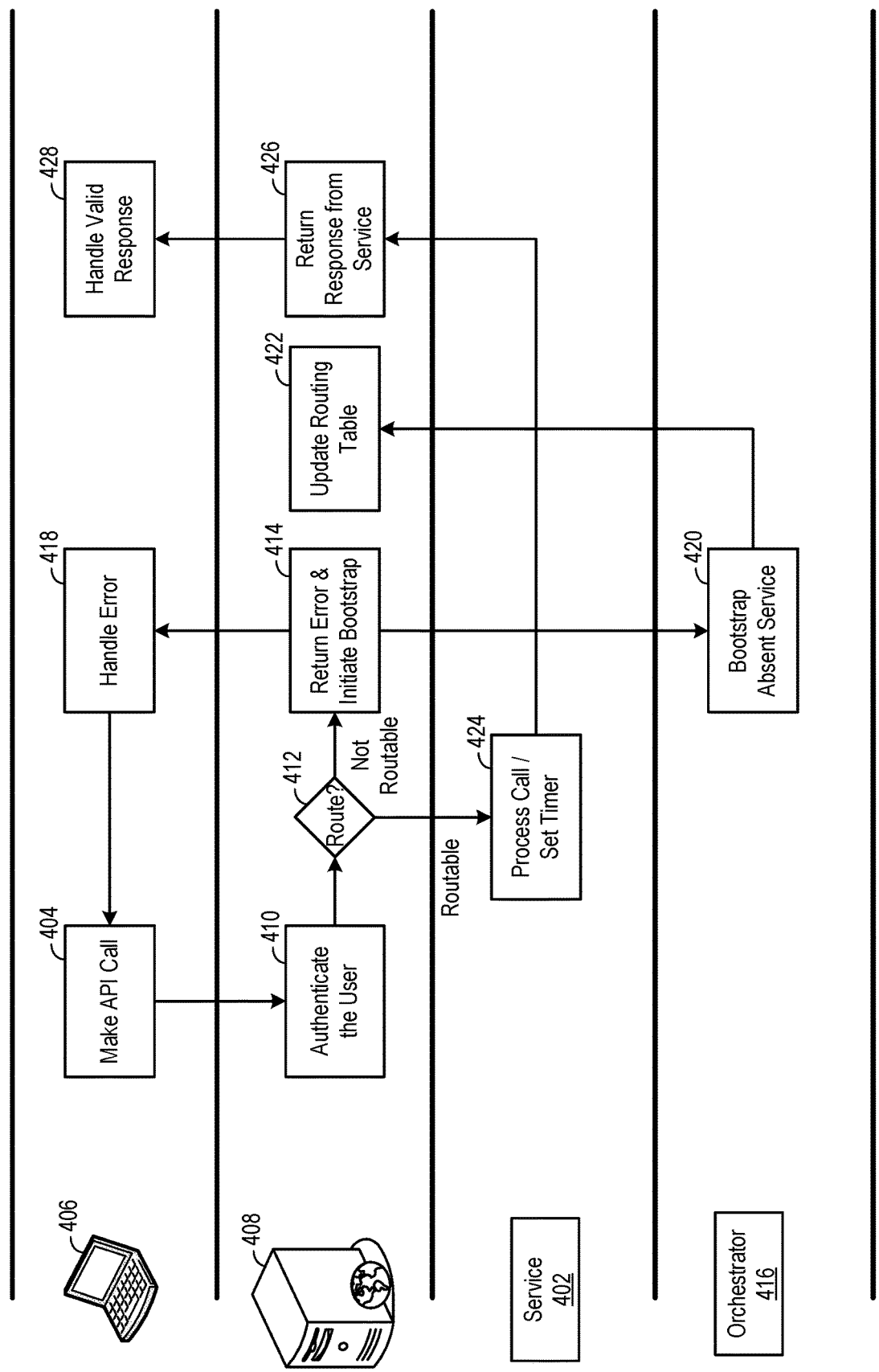
FIG. 4 is a flow diagram for illustrating a flow of operations performed in response to an API call for a service that has not yet been deployed, in accordance with at least one embodiment.

FIG. 4 is a flow diagram for illustrating a flow 400 of operations performed in response to an API call for a service (e.g., service 402) that has not yet been deployed, in accordance with at least one embodiment. In some embodiments, a predefined set of services may be previously deployed in the region and/or accessible to the user device by API call. Service 402 may not be included in that initial predefined set of deployed services.

The flow 400 may begin at 404, where an API request may be made by user device 406 (e.g., an example of the user device 306 of FIG. 3). In some embodiments, the API call can be performed via the HTTPS protocol or similar protocols. The API call may include any suitable information such as an identifier of the user, an identifier for the service associated with the request, or the like. The API call may be received by gateway computer 408, which may the same or similar to the gateway computer 408 and which may be an example of a computer that implements the WAN gateway 126 of FIG. 1. Similar to the gateway computer discussed above, the gateway computer 408 may be configured to maintain a routing table for previously deployed regional services (e.g., the cloud services A-N of FIG. 2). The routing table may include Internet Protocol (IP) addresses for each service and/or infrastructure component within the environments provided by the architectures of FIGS. 1 and 2. The routing table may contain any suitable information needed to forward a data packet along toward its destination. For example, the routing table may include a network identifier (e.g., an IP address) for the destination, a subnet mask that is used to match the destination IP address to the network ID, and any suitable information configured to enable the data packet to be forwarded to toward the destination.

At 410, the gateway computer 408 (or any suitable component of FIG. 2, such as ingress proxy 218, CIOS regional 202, or the like) may authenticate the user of the API call. As described above, authentication may include making an API call to one or more services (e.g., an identity service) configured to maintain permissions and/or identity data for one or more users of the system. By way of example, the gateway computer 308 may call an identity service configured with permissions and/or identity data that may be utilized with the identifier of the user as received in the request to identify the user and/or one or more permissions policies associated with that user. As another example, the gateway computer 408 may maintain user data associated with any suitable number of users and may authenticate the user against that user data using any suitable information obtained from the API call (e.g., an identifier associated with the user).

At 412, a determination may be made as to whether the API call is able to be routed. This determination may include any suitable combination of identifying 1) if the user is who they purport to be, 2) if the user has authorization to invoke such functionality of the service 302, or 3) if an identifier for the service (e.g., an IP address) is included in the current routing table maintained by the gateway computer 408. This determination may be similar to the one made at 312 of FIG. 3.

If the API call is not routable (e.g., the service 402 has not yet been deployed, is not included in the routing table, etc.), the flow 400 may proceed to 414, where a return error may be forwarded to the user device 406 and data may be sent to orchestrator 416 (e.g., CIOS Central 102 of FIG. 1) indicating that a bootstrap of the requested service (e.g., service 402) is to be initiated.

At 418, the user device 406 may be configured to perform one or more operations to handle the error such as displaying at the screen an indication of the error, enabling user options to attempt another request, etc. Upon making another API call, the flow may proceed back to 404 and the remaining portion of the flow may be repeated any suitable number of times. The operations of 414, 418, and 420 may be executed in any suitable order.

At 420, the orchestrator 416 may receive the bootstrap request and perform any suitable operations for bootstrapping (e.g., loading into memory (e.g., memory of a virtual machine) and/or initializing) the absent service (e.g., service 402). In some embodiments, the orchestrator 416 may utilize a predefined set of instructions associated with bootstrapping the service 402. By way of example, a directed acyclic graph (DAG) associated with the service 402 may be utilized to identify one or more instructions for bootstrapping the service 402. In some embodiments, this DAG is part of a larger DAG that maintains interdependencies of various services with capabilities of other services (e.g., a specific portion of functionality provided by another service). The DAG associated with service 402 may be any suitable part of a finite directed graph that includes any suitable number of nodes and edges with each edge being directed from one node to another. The nodes and edges may be arranged to avoid directed cycles. Thus, the finite directed graph (e.g., the DAG) is arranged such that there is no way to start at any node and follow a consistently directed sequence of edges that eventually loop back to that same node. A last node of the finite directed graph may point to a null value or otherwise indicate an end to the finite directed graph.

In some embodiments, each node of the DAG corresponds to a set of operations or a set of capabilities on which a next node of operations depends. The directed edges of each DAG define an order by which these operations are to be executed and/or a dependency between a subset of operations associated with a node and a subset of capabilities associated with an immediately preceding node. The operations of each node are to be executed in the order corresponding to the order of nodes and may individually correspond with one or more dependencies. By way of example, a first node in the DAG may correspond to a dependency of operations corresponding to a third node of the DAG (e.g., corresponding to service 402) on a capability associated with a different resource (e.g., service A). Similarly, a second node of the DAG may correspond to a dependency of operations corresponding to the third node (e.g., representing service 402) on a capability associated with a different resource (e.g., resource B). In some embodiments, different capability nodes (e.g., a node identifying a dependency on a particular resource's capability/capabilities) may be used for different resources, or a single node may be utilized to specify all dependencies regardless of how many resources to which the dependencies refer. Thus, in some embodiments, the dependency of service 402 on service A and resource B may be combined in a single node.

The DAG may be traversed to orchestrate the execution of operations for booting and/or deploying a resource in a cloud-computing environment (e.g., the service 402) with respect to one or more dependencies on capabilities of other resources (or other resources themselves).

At 422, once service 402 has been bootstrapped (e.g., an predefined image for the service 402 is deployed to a particular computer within the environment/region) and is ready to accept subsequent requests, the orchestrator 416 may transmit data (e.g., an IP address associated with the service 402, an alphanumeric identifier associated with the service 402, etc.) to the gateway computer 408 to update the routing table maintained by the gateway computer 408. The gateway computer 408 may be configured to update the routing table with any suitable portion of the data provided by the orchestrator 416 and associated with the service 402. Although not depicted, in some embodiments, the gateway computer 408 may transmit any suitable data to the user device 406 to indicate the service 402 is ready.

Subsequently, a user may initiate a new API call at 404 and the operations of 404-412 may be repeated. Now that the routing table includes the data associated with the service 402 (e.g., the identifier for the service, an IP address for the service 402, etc.), the determination made at 412 may indicate the API call is now routable to the service 402 and the API call may be forwarded to the service 402 at 424. In some embodiments, the service 402 may initiate a timer for a predefined period of time. This timer may be configured to maintain knowledge of when the service 402 was last called. The purpose here is to be able to wind down service 402 if another API call is not received for the service within a predefined period of time from the last received API call. This process is described in more detail with respect to FIG. 7.

At 426, the service may return a response to the gateway computer 408. In some embodiments, this response may indicate whether the processing was successful (e.g., completed) or unsuccessful (e.g., incomplete/not allowed). The gateway computer 408 may forward the response to the user device 406.

At 428, the user device 406 may receive the response and execute any suitable operations such as, but not limited to, displaying for the user an indication that the API call was successfully processed.

In should be appreciated that, if the service 402 was initially available after the first API call described above, the flow 400 may proceed from 412 to 424 while forgoing the entire bootstrapping process and routing table update as the service would have already been available at the time of the API request.

Figure 5:
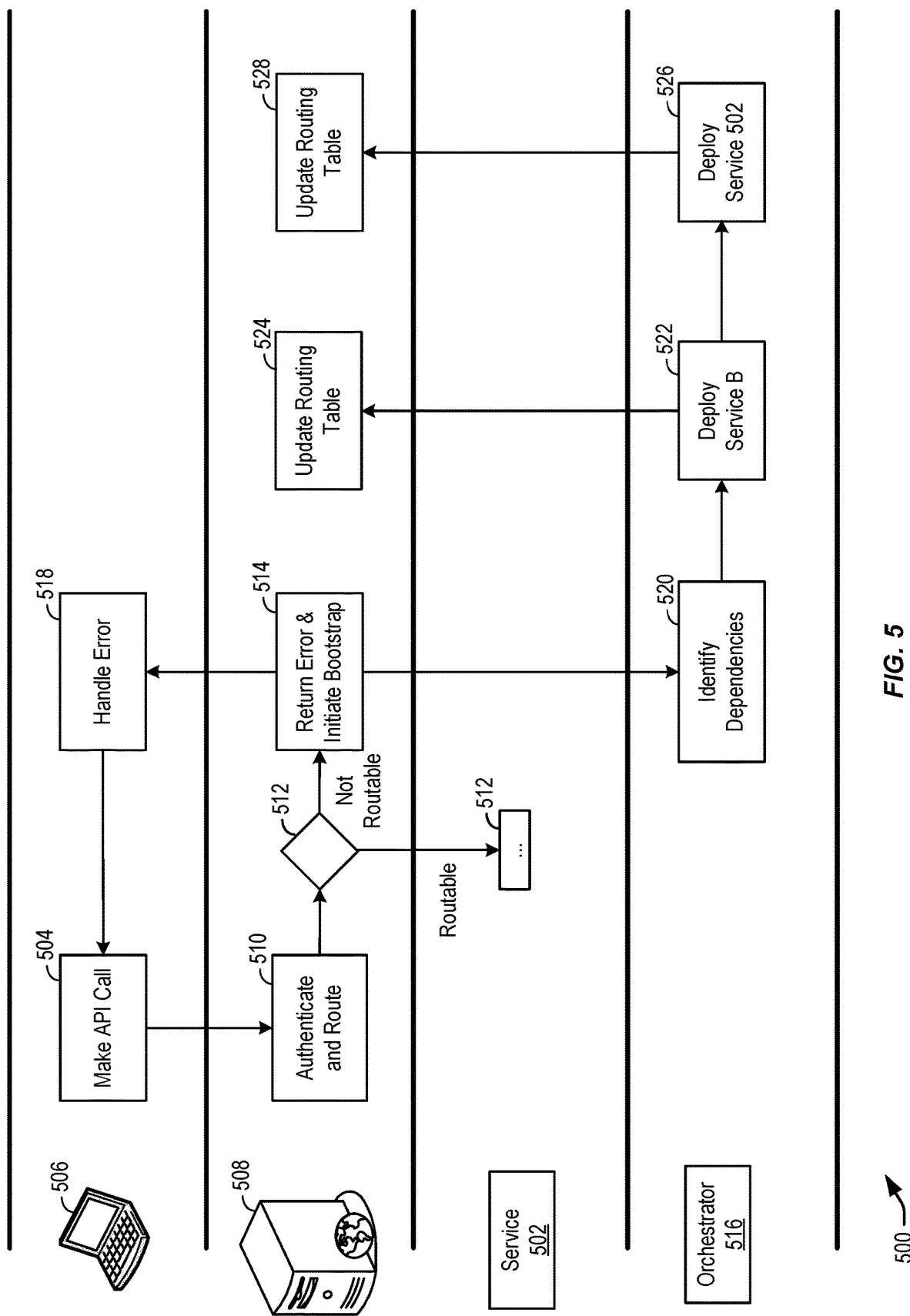
FIG. 5 is a flow diagram for illustrating a flow of operations performed in response to an API call for a service that has not yet been deployed when the service depends on another service that also has not yet been deployed, in accordance with at least one embodiment.

FIG. 5 is a flow diagram for illustrating a flow 500 of operations performed in response to an API call for a service (e.g., service 502) that has not yet been deployed, when the service depends on another service that also has not yet been deployed, in accordance with at least one embodiment.

The flow 500 may begin at 504, where an API request may be made by user device 506 (e.g., an example of the user device 406 of FIG. 4). In some embodiments, the API can be performed via the HTTPS protocol or similar protocols. The operations performed at 504, 510, 512, 514, and 518 may be substantially the same as the operations discussed at 404, 410, 412, 414, and 418 of FIG. 4. The API call may be received by gateway computer 508, that may the same or similar to the gateway computer 408 of FIG. 5, which may be an example of a computer that implements the WAN gateway 126 of FIG. 1.

At 520, in response to receiving a request to the bootstrap request transmitted at 514, the orchestrator 516 (e.g., the CIOS Central 102 of FIG. 1), may perform any suitable operations for bootstrapping (e.g., loading into memory (e.g., memory of a virtual machine) and/or initializing) the absent service (e.g., service 502, an example of the service 402 of FIG. 4). In some embodiments, the orchestrator 516 may utilize a predefined set of instructions associated with bootstrapping the service 502. By way of example, a directed acyclic graph (DAG) associated with the service 502 may be obtained (e.g., from memory) and utilized to identify one or more instructions for bootstrapping the service 502.

Figure 6:
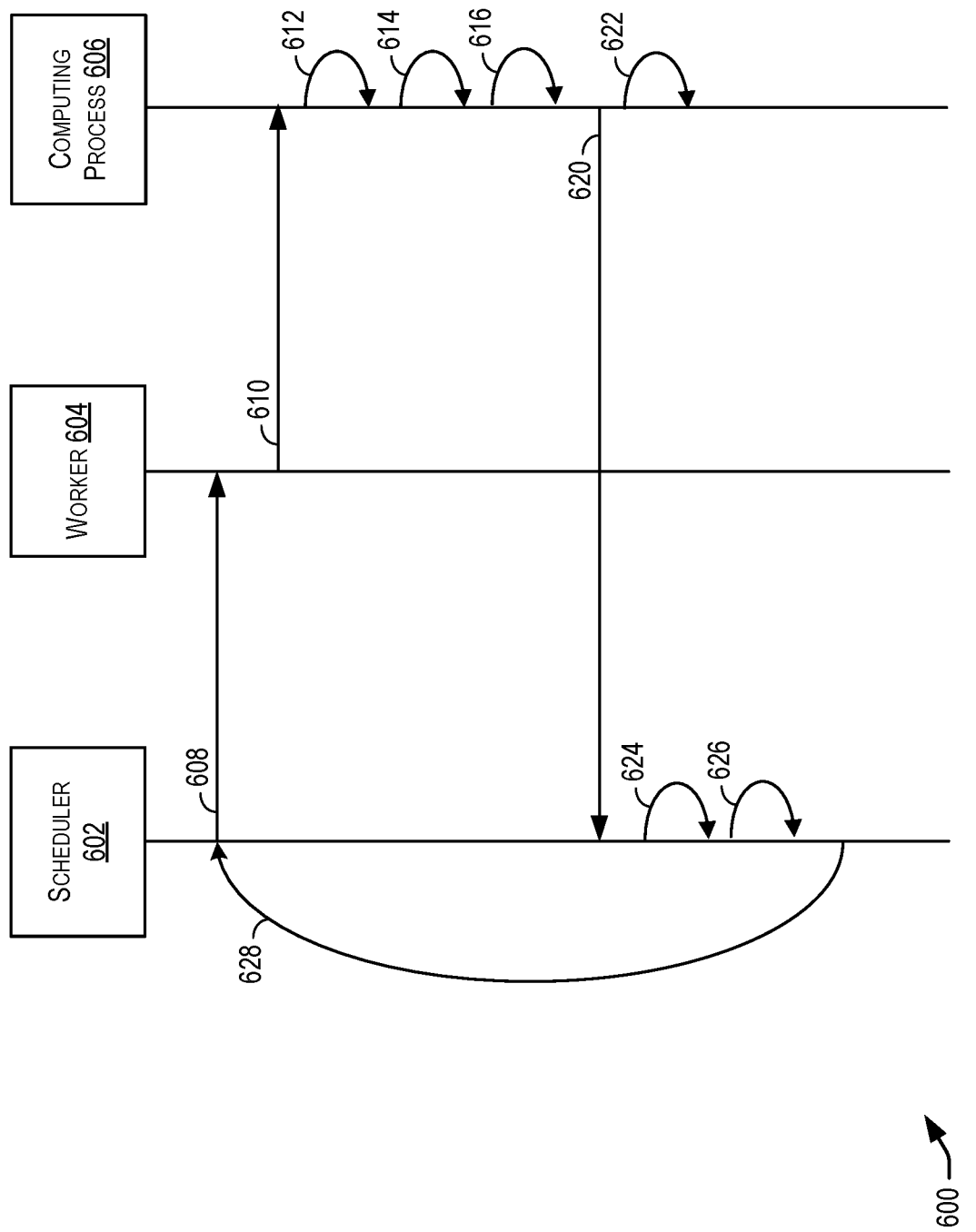
FIG. 6 is a flow diagram illustrating an example process for orchestrating the execution of a task that includes a dependency on at least one capability, according to at least one embodiment.

FIG. 6 is a flow diagram illustrating an example process 600 for orchestrating the execution of a task (e.g., deploying/bootstrapping a resource such as service 502 of FIG. 5) that includes a dependency on at least one capability (e.g., a capability of a different resource), according to at least one embodiment. As illustrated in FIG. 6, the process flow 600 includes a scheduler 602 (e.g. the scheduler 206 of FIG. 2), a worker 604 (e.g. the worker 210 of FIG. 2), and a process 606 (e.g. an example of the CIOS container 212 of FIG. 2).

At 608, the scheduler 602 may receive a task for deploying one or more infrastructure components/resources (such as service 502) in a region, and the scheduler 602 may transmit data pertaining to the task to the worker 604. In some embodiments, the scheduler 602 may instantiate the worker 604 to handle deployment of a resource (e.g., the service 502).

At 610, the worker 604 may instantiate computing process 606 which may be configured to execute an instance of a declarative infrastructure provisioner (e.g., a declarative provisioning tool such as Terraform).

At 612, the computing process 606 may parse a configuration file associated with the deployment to generate a directed acyclic graph (DAG) for a particular resource (e.g., service 502).

As discussed above, each node of the DAG corresponds to a set of operations or a set of capabilities on which a next node of operations depends. The directed edges of each DAG define an order by which these operations are to be executed and/or a dependency between a subset of operations associated with a node and a subset of capabilities associated with an immediately preceding node. The operations of each node are to be executed in the order corresponding to the order of nodes and may individually correspond with one or more dependencies. Through parsing the configuration, the computing process 606 may identify any suitable number of implicit and/or explicit dependencies on capabilities of other resources. By way of example, the computing process 606 may identify that service 502 depends on another service (referred to as "service B"). Once identified, the computing process 606 builds a DAG that specifies tasks for booting and/or deploying a resource with potentially one or more nodes that correspond to a capability on which the resource depends (e.g., in accordance with the implicit and/or explicit dependencies identified during the parsing). In some embodiments, the DAG may already be generated and stored in memory. In this situation, the DAG may simply be retrieved rather than regenerated through parsing.

At 614, the computing process 606 may begin traversing the DAG, executing at least a portion of the deployment and/or booting of the particular resource as various nodes of the DAG are reached. In accordance with at least one node of the DAG, any suitable operations may be executed to cause a portion of functionality corresponding to the resource to become available. It may be that multiple portions of functionality corresponding to the resource become available. In some embodiments, the computing process 606 may transmit to the scheduler 602 a notification indicating one or more capabilities of the resource is now available (not depicted). At least one of the nodes of the DAG may correspond to a capability of one or more other resources. When these types of nodes are reached, the computing process 606 may check to see if the capability is available. If so, the computing process 606 may proceed with its traversal of the DAG.

At 616, the computing process 606 may reach a node of the DAG that corresponds to one or more capabilities of one or more other resources. In some embodiments, the computing process 606 may determine that at least one capability associated with the node is not yet available.

At 620, in response to determining at least one capability associated with the node is unavailable, the computing process 606 may transmit data to the scheduler 602 indicating the one or more capabilities on which the resource corresponding to the computing process 606 depends which have been determined to be unavailable.

At 622, the computing process 606 may exit after potentially storing state information indicating what operations and/or node of the DAG have already been completed and/or at what particular node of the DAG the computing process 606 was last accessing. The computing process 606 exits, is killed, is suspended, or otherwise ceases to execute.

At 624, the scheduler 602 may store information indicating that the particular resource was awaiting one or more particular capabilities which are needed for the resource to resume booting and/or for deployment purposes.

At 626, the scheduler 602 may receive one or more notifications that the one or more capabilities for which the resource was waiting have become available. In some embodiments, the scheduler 602 may receive various notification from other computing processes (e.g., threads) indicating various capabilities of corresponding resources as those capabilities become available. The scheduler 602 may maintain one or more records of the various capabilities that are available and/or of the various capabilities for which resources are currently waiting. The scheduler 602 may identify from the one or more records that the particular capability/capabilities on which the resource corresponding to computing process 606 is waiting have become available. Accordingly, the scheduler 602 may proceed to 628.

At 628, in response to determining that the capabilities on which the resource corresponding to computing process 606 depends have become available, the scheduler 602 may return to step 608, where it transmits data pertaining to the original task (e.g., deploying the resource) to the worker 604. In some embodiments, the scheduler 602 may instantiate a new worker or utilize the previous worker 604 (as depicted) to continue handling the task associated with the resource. The worker 604 may instantiate a process (not depicted) which may be configured to execute parse the configuration file to generate (or otherwise obtain) the DAG for the resource. That process may access the stored state information to identify the node that was last access in the DAG (e.g., the node corresponding to the one or more capabilities for which the resource was waiting). Since the one or more capabilities are now available, the process may proceed with its traversal of the DAG in a similar manner as discussed above, executing operations at each node either execute a portion of the task or check for capabilities on which a next portion of the task depends, until the operations for deploying/bootstrapping the resource (e.g., service 502) are complete.

A similar process as discussed above may be performed for every resource of the task. By way of example, when deploying a system with multiple resources (e.g., multiple services), the process 600 may be performed on behalf of each resource in order to deploy each resource in the system.

Returning to FIG. 5, at 520 the orchestrator 516 may identify one or more dependencies associated with service 502. As described above, a DAG associated with the service 502 may be obtained (e.g., generated or retrieved from memory). One or more nodes of the DAG may correspond to one or more dependencies. As a non-limiting example, the DAG for service 502 (or portion of the DAG associated with service 502) may indicate that service 502 depends on another service (e.g., service B). That is, a node corresponding to service B may be provided before a node corresponding to service 502.

In accordance with identifying the dependency on service B, the orchestrator 516 may execute any suitable operations for deploying/bootstrapping service B at 522. At 524, once service B has been bootstrapped (e.g., an predefined image for the service B is deployed to a particular computer within the environment/region) and is ready to accept subsequent requests, the orchestrator 516 may transmit data (e.g., an IP address associated with the service B, an alphanumeric identifier associated with the service B, etc.) to the gateway computer 508 to update the routing table maintained by the gateway computer 508. The gateway computer 508 may be configured to update the routing table with any suitable portion of the data provided by the orchestrator 516 and associated with the service B. Although not depicted, in some embodiments, the gateway computer 508 may transmit any suitable data to the user device 506 to indicate the server B is ready.

At 526, the orchestrator 516 may identify that service B has been deployed and may proceed to execute any suitable operations for deploying/bootstrapping the service 502. At 528, once service 502 has been bootstrapped (e.g., an predefined image for the service 502 is deployed to a particular computer within the environment/region) and is ready to accept subsequent requests, the orchestrator 516 may transmit data (e.g., an IP address associated with the service 502, an alphanumeric identifier associated with the service 502, etc.) to the gateway computer 508 to update the routing table maintained by the gateway computer 508. The gateway computer 508 may be configured to update the routing table with any suitable portion of the data provided by the orchestrator 516 and associated with the service 502. Although not depicted, in some embodiments, the gateway computer 508 may transmit any suitable data to the user device 506 to indicate the service 502 is ready.

Subsequently, a user may initiate a new API call at 504 and the operations of 504, 510, and 512 may be repeated. Now that the routing table includes the data associated with the service 502 (e.g., the identifier for the service, an IP address for the service 502, etc.), the determination made at 512 may indicate the API call is now routable to the service 502 and the API call may be forwarded to the service 502 at 530. Starting at 530, operations corresponding to the service 502 and the operations of 424-428 of FIG. 4 may be performed. For example, the service may return a response to the gateway computer 508, which in turn may forward the response to the user device 506. This response may indicate whether the processing was successful (e.g., completed) or unsuccessful (e.g., incomplete/not allowed). The user device 506 may receive the response and execute any suitable operations such as, but not limited to, displaying for the user an indication that the API call was successfully processed.

In should be appreciated that, if the service 502 was initially available after the first API call described above, the flow 400 may proceed from 512 to 530 while forgoing the entire bootstrapping process and routing table update as the service would have already been available at the time of the API request.

Figure 7:
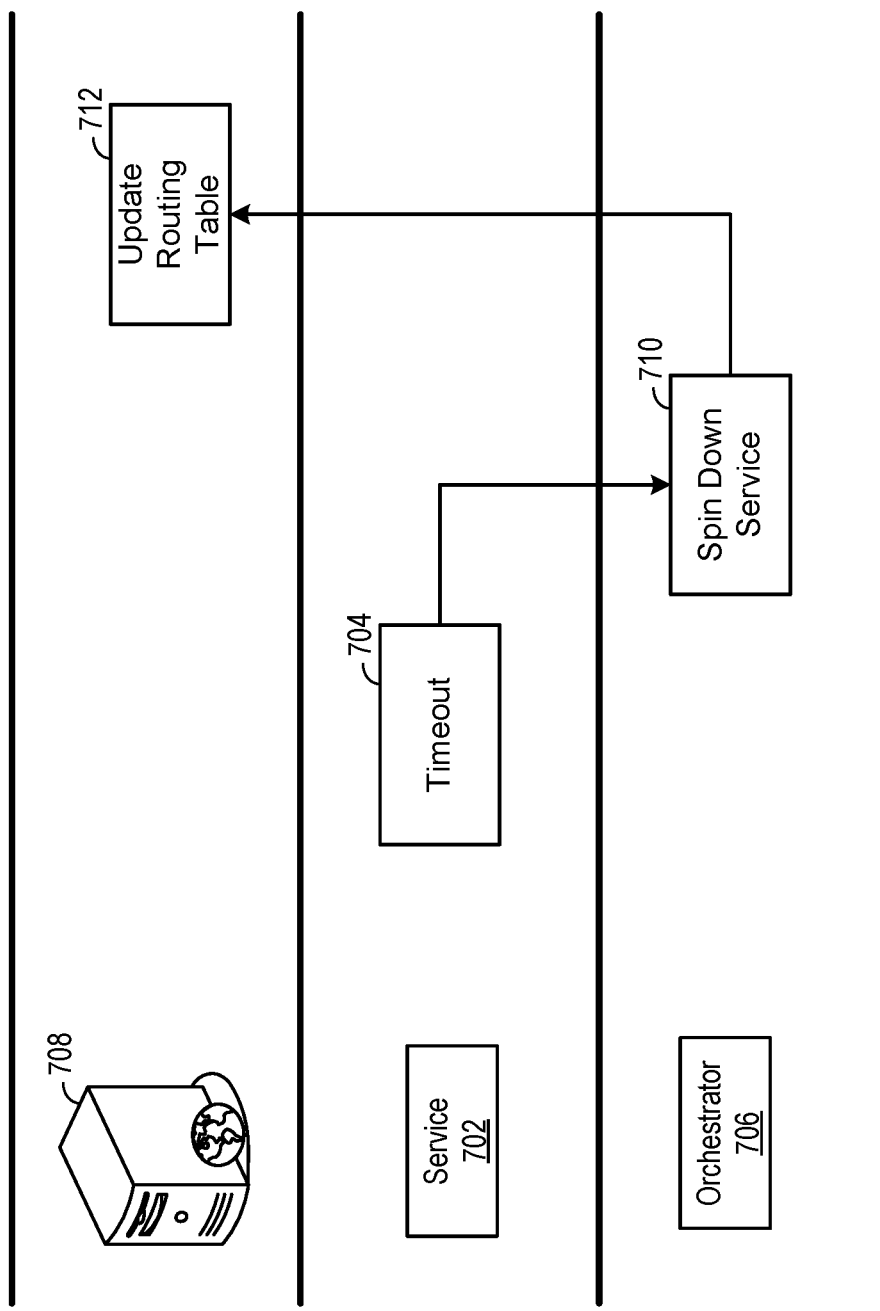
FIG. 7 is a flow diagram illustrating a flow of operations for spinning down an unused service, according to at least one embodiment.

FIG. 7 is a flow diagram illustrating a flow 700 of operations for spinning down an unused service, according to at least one embodiment. Prior to executing the operations of flow 700, it may be assumed that the service 702 (e.g., an example of the service 402 of FIG. 4) was bootstrapped and that a timer was set upon receipt of the last API call to the service 702.

The flow 700 may begin at 704, where a timeout of the timer set at 424 of FIG. 4 (and similarly at 530 of FIG. 5 for service 502) occurs. In some embodiments, the timeout may trigger an event that is received by service 702. In response to identifying the timeout (e.g., receiving the event), the service 702 may be configured to transmit any suitable data to indicate to the orchestrator 706 (e.g., an example of the orchestrator 416 of FIG. 4) that service 702 is no longer in use (e.g., as indicated by not receiving any requests in a predefined period of time such as the last hour, as indicated by receiving less than a threshold amount of requests in a previous predefined period of time, etc.). Although service 702 is depicted as receiving the event, it may be the case that the event is received (or the timeout is otherwise identified) by the gateway computer 708 (e.g., an example of the gateway computer 408 of FIG. 4). By way of example, the gateway computer may be configured to determine a service is to be spun down based on periodically identifying a last time at which a last request for service 702 was received and determining a difference between the last time and the current time exceeds a threshold period of time. Although a time out is used for illustration as the mechanism for triggering the spin down of service 702, any suitable trigger may be utilized. By way of example, spinning down service 702 may be triggered based at least in part on receiving a request (e.g., from a user device) to spin down one or more services (e.g., including service 702).

In some embodiments, a service may be deemed safe to spin down if it has no active resource instances under its management (or otherwise determining that no other component of the cloud-computing environment depends on the service). If the service is managing one or more resource instances, that status of these resources instances may be monitored to determine when and/if the service is no longer managing any resources instances. As part of this monitoring, a check for these resource instance may occur periodically, according to a schedule or predefined frequency (e.g., every minute, every 30 seconds, etc.).

At 710, the orchestrator 706 may receive the data (a message and/or indicator requesting spin down) provided by the service 702 (or alternatively, by the gateway computer 708). In response to receiving this data, the orchestrator 706 may be configured to execute any suitable operations for spinning down service 702. In some embodiments, the operations may be predefined, provided in a DAG that identifies an order by which operations are to be performed to spin down a service. In some embodiments, the orchestrator 706 may determine whether other resources (e.g., other services on which the service 702 depended are needed). By way of example, the orchestrator 706 may identify a request rate, a number of previous requests in a previous period of time (e.g., the last ten minute, hour, day, etc.), with which functionality of a dependent resource (e.g., a service on which service 702 depends) was last utilized. The orchestrator 706 may utilize a predefined rule set to identify whether the dependent resource is still needed (e.g., by other services as suggested by a rate/number that breaches a predefined threshold). In accordance with determining the dependent resource is no longer needed, the orchestrator 706 may execute operations to spin down the dependent resource as well as the service 702. In some embodiments, the orchestrator 706 may be configured to request and receive user input requesting user input indicating approval to proceed with the spin-down request prior to transmitting the spin-down request for any resource (e.g., the dependent resource and/or the service 702).

At 712, the orchestrator 706 can update the routing table maintained by the gateway computer 708. In some embodiments, updating the routing table may include transmitting, by the orchestrator 706, data indicating (e.g., by identifier (s)) that the service 702 (and, if applicable, one or more dependent resources) are no longer utilized. In response to receiving this data, the gateway computer 708 may remove or otherwise disassociate the service and any suitable number of one or more dependent services if they too were indicated as being unutilized (or at least underutilized) by the data received at 712. Subsequent to completion of flow 700, the flow 400 may be performed any suitable number of times.

Figure 8:
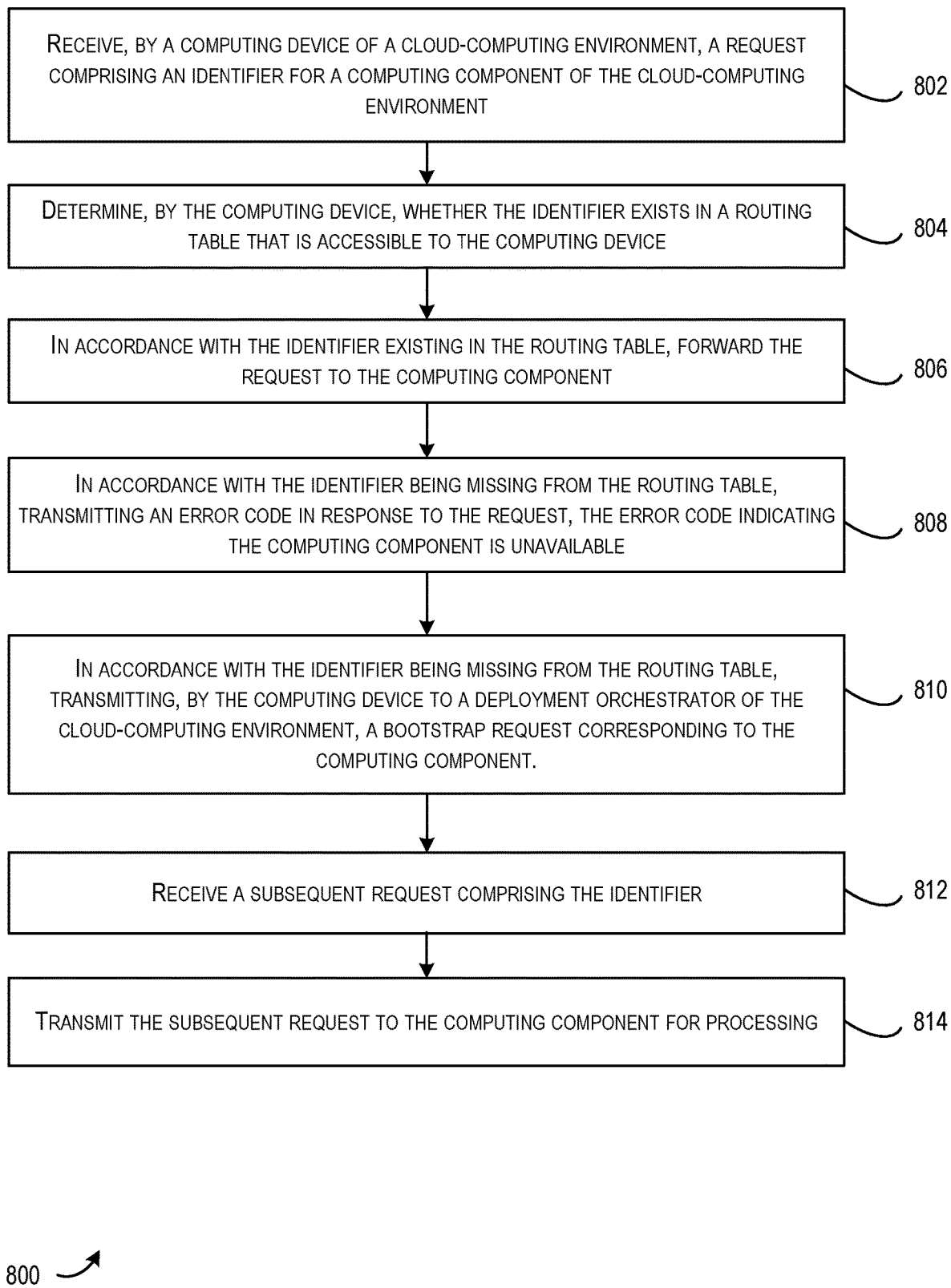
FIG. 8 is a flow diagram illustrating an example process for orchestrating the bootstrapping of a service in response to receiving an API request, according to at least one embodiment.

FIG. 8 is a flow diagram illustrating an example method 800 for orchestrating the bootstrapping of a service in response to receiving an API request, according to at least one embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, the method 800 may be performed under the control of one or more computing devices or computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. In some embodiments, the method 1000 may be performed by a plurality of processors in parallel. The computer-readable storage medium may be non-transitory. In some embodiments, the method 800 is performed by an orchestrator (e.g., the CIOS Regional 202 via scheduler 206, worker 210, and/or CIOS container 212 of FIG. 2, the orchestrator 416, 516, and/or 706 of FIGS. 4, 5, and 7, respectively).

The method 800 may begin at 802, where a request (e.g., an API call provided via an HTTP request) comprising an identifier for a computing component (e.g., service 402 of FIG. 4) of a cloud-computing environment is received (e.g., by the gateway computer 408 of FIG. 4).

At 804, the computing device may determine whether the identifier (or any suitable information corresponding to the service associated with that identifier) exists in a routing table that is accessible to the computing device (e.g., a routing table maintained/managed by the gateway computer 408 of FIG. 4).

At 806, in accordance with the identifier existing in the routing table, the computing device (the gateway computer 408) may forward the request to the computing component (e.g., the service 402).

At 808, in accordance with the identifier being missing from the routing table, an error code may be transmitted by the computing device in response to the request. In some embodiments, the error code may indicate that the computing component is unavailable. The error code may, for example, be transmitted to a user device from which the request was initiated.

At 810, in accordance with the identifier being missing from the routing table, a bootstrap request corresponding to the computing component may be transmitted (e.g., by the computing device to a deployment orchestrator (e.g., orchestrator 406) of the cloud-computing environment). In some embodiments, the deployment orchestrator is configured to deploy the computing component to the cloud-computing environment based at least in part on the bootstrap request. The particular operations of such a deployment may be identified from a DAG as described above in connection with FIGS. 5 and 6.

At 812, a subsequent request comprising the identifier may be received. In some embodiments, the identifier may now be stored in the routing table maintained by the computing component in accordance with being added after bootstrapping was complete.

At 814, the subsequent request is transmitted (e.g., by the gateway computer 408) to the computing component (e.g., service 402) for processing.

Figure 9:
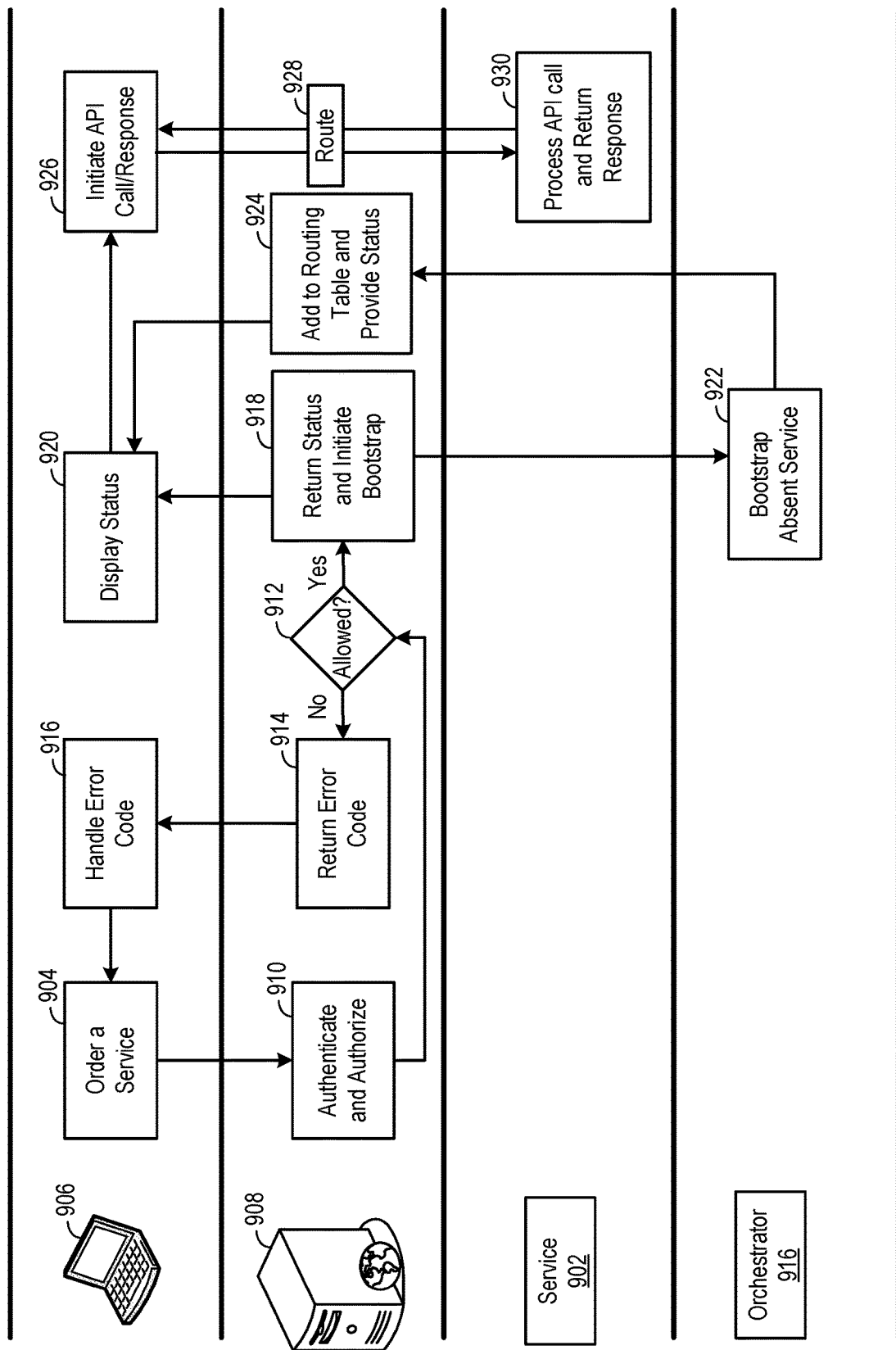
FIG. 9 is a flow diagram for illustrating a flow of operations performed in response to ordering a service that has not yet been deployed, in accordance with at least one embodiment.

FIG. 9 is a flow diagram for illustrating a flow 900 of operations performed in response to ordering a service that has not yet been deployed, in accordance with at least one embodiment. In some embodiments, a predefined set of services may be previously deployed in the region and/or accessible to the user device by API call. Service 902 may not be included in that initial predefined set of deployed services. Alternatively, service 902 may have previously been operational but spun down and is no longer accessible. In either scenario, at the time the operations of flow 900 are commenced, service 902 is assumed to be inaccessible/not operational (e.g., service 902 is not deployed).

The flow 900 may begin at 904, where a service (e.g., service 902) may be ordered. In some embodiments, a user may access a user interface via user device 906. An example interface will be discussed in further detail below in connection with FIG. 11. In accordance with user input provided at the interface and to request the service 1002 be ordered, an API request may be made by user device 906 (an example of the user device 406 of FIG. 4). In some embodiments, the API request can be performed via the HTTPS protocol or similar protocols. The request may include any suitable information such as an identifier of the user, user credentials, an identifier for the service associated with the request, or the like. The API call may be received by gateway computer 908, which may the same or similar to the gateway computer 408 of FIG. 4 and which may be an example of a computer that implements the WAN gateway 126 of FIG. 1. Similar to the gateway computer discussed above, the gateway computer 908 may be configured to maintain a routing table for previously deployed regional services (e.g., the cloud services A-N of FIG. 2). The routing table may include Internet Protocol (IP) addresses for each service and/or infrastructure component within the environments provided by the architectures of FIGS. 1 and 2. The routing table may contain any suitable information needed to forward a data packet along toward its destination. For example, the routing table may include a network identifier (e.g., an IP address) for the destination, a subnet mask that is used to match the destination IP address to the network ID, and any suitable information configured to enable the data packet to be forwarded to toward the destination.

At 910, the gateway computer 408 (or any suitable component of FIG. 2, such as ingress proxy 218, CIOS regional 202, or the like) may authenticate the user of the API call and determine whether the user is authorized to order the service. As described in other examples above, authentication may include making an API call to one or more services (e.g., an identity service) configured to maintain permissions and/or identity data for one or more users of the system. By way of example, the gateway computer 308 may call an identity service configured with permissions and/or identity data that may be utilized with the identifier of the user as received in the request to identify the user and/or one or more permissions policies associated with that user. As another example, the gateway computer 908 may maintain user data associated with any suitable number of users and may authenticate the user against that user data using any suitable information obtained from the API call (e.g., an identifier associated with the user).

At 912, a determination may be made as to whether the request is allowed. This determination may include any suitable combination of identifying 1) if the user is who they purport to be, and 2) if the user has authorization to order a resource (e.g., service 902). In some embodiments, user data obtained from the request such as user credentials may be utilized to obtain permissions data that indicates the particular or type of service that are orderable by the user.

If the permissions data indicates that the user is not allowed to order the requested service (or that type of service), the flow 900 may proceed to 914, where an error code may be returned to the user device 906 by the gateway computer 908. The error code may be any suitable value that indicates the user is not allowed to order service 902. At 916, the user device 906, in response to receiving the error code, may be configured to present any suitable data at the user interface to indicate the order was not successful/not allowed.

Alternatively, if the order for service 902 is allowed as determined at 912, the flow 900 may proceed to 918, where a return status may be forwarded to the user device 906 and data may be sent to orchestrator 916 (e.g., CIOS Central 102 of FIG. 1) indicating that a bootstrap of the requested service (e.g., service 902) is to be initiated.

At 920, the user device 406 may be configured to perform one or more operations to display the status received from the gateway computer 908. By way of example, the user device 406 may present a status such as "Requested" adjacent to an identifier for the service 902 to indicate the service 902 has been ordered but is not yet operational.

At 922, the orchestrator 916 may receive the bootstrap request and perform any suitable operations for bootstrapping (e.g., loading into memory (e.g., memory of a virtual machine) and/or initializing) the absent service (e.g., service 902). In some embodiments, the orchestrator 916 may utilize a predefined set of instructions associated with bootstrapping the service 902. The orchestrator 916 may traverse a DAG associated with the service 902 to identify and execute the operations for booting and/or deploying service 902 to the cloud-computing environment in which the order was received. This process may be similar or the same to that described above in connection with the DAG discussed in the description of FIG. 4.

At 924, once service 402 has been bootstrapped (e.g., an predefined image for the service 902 is deployed to a particular computer within the environment/region) and is ready to accept subsequent requests, the orchestrator 916 may transmit data (e.g., an IP address associated with the service 902, an alphanumeric identifier associated with the service 902, etc.) to the gateway computer 908 to update the routing table maintained by the gateway computer 908. The gateway computer 908 may be configured to update the routing table with any suitable portion of the data provided by the orchestrator 916 and associated with the service 902. In some embodiments, the gateway computer 908 may transmit any suitable data to the user device 906 to indicate the service 902 is ready. The user device 906 may present the status upon receipt (depicted at 920).

Subsequently, a user may initiate an API call at 926 corresponding to the service 902. Operations corresponding to blocks 404-412 may be performed with respect to the service 902 to identify if the user is whom they purport to be and are authorized to make the API call. If not, an error code may be provided and displayed to the user at the user device 906. Alternatively, the API call may be routed to the service 902 at 928 by the gateway computer 908 now that the routing table includes the data associated with the service 902 (e.g., the identifier for the service, an IP address for the service 902, etc.).

At 930, the service 902 may process the API call. In some embodiments, the service 902 may initiate a timer for a predefined period of time. This timer may be configured to maintain knowledge of when the service 902 was last called. If the service 902 is not utilized again for a predefined period of time, the process described in connection with FIG. 7 may be executed to spin down the service 902. The service 902 may return a response to the gateway computer 908 as a result of processing the API call. In some embodiments, this response may indicate whether the processing was successful (e.g., completed) or unsuccessful (e.g., incomplete/not allowed). The gateway computer 908 may forward the response to the user device 906. The user device 906 may receive the response and execute any suitable operations such as, but not limited to, displaying for the user an indication that the API call was successfully processed.

Figure 10:
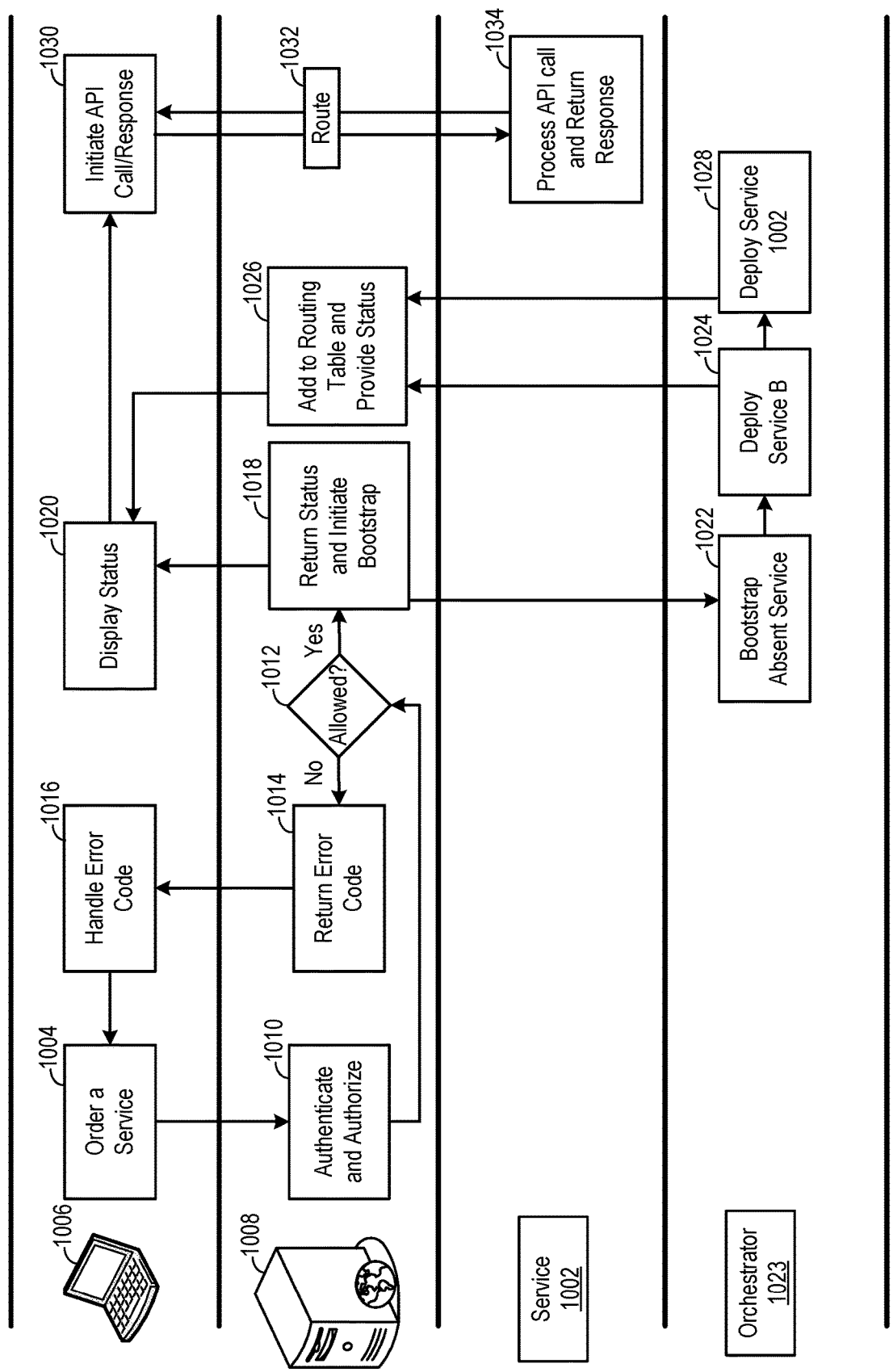
FIG. 10 is a flow diagram for illustrating a flow of operations performed in response to ordering a service that has not yet been deployed when the service depends on another service that also has not yet been deployed, in accordance with at least one embodiment.

FIG. 10 is a flow diagram for illustrating a flow 1000 of operations performed in response to ordering a service that has not yet been deployed when the service depends on another service that also has not yet been deployed, in accordance with at least one embodiment. In some embodiments, a predefined set of services may be previously deployed in the region and/or accessible to the user device by API call. Service 1002 may not be included in that initial predefined set of deployed services. Alternatively, service 1002 may have previously been operational but spun down and is no longer accessible. In either scenario, at the time the operations of flow 1000 are commenced, service 1002 is assumed to be inaccessible/not operational (e.g., service 1002 is not deployed).

The flow 1000 may begin at 1004, where a service (e.g., service 1002, an example of the service 902 of FIG. 9) may be ordered. In some embodiments, a user may access a user interface via user device 1006. An example interface will be discussed in further detail below in connection with FIG. 11. In accordance with user input provided at the interface, an API call may be made by user device 1006 (an example of the user device 406 of FIG. 4). In some embodiments, the API call can be performed via the HTTPS protocol or similar protocols. The request may include any suitable information such as an identifier of the user, user credentials, an identifier for the service associated with the request, or the like. The API call may be received by gateway computer 1008, which may the same or similar to the gateway computer 408 of FIG. 4 and which may be an example of a computer that implements the WAN gateway 126 of FIG. 1. Similar to the gateway computer discussed above, the gateway computer 1008 may be configured to maintain a routing table for previously deployed regional services (e.g., the cloud services A-N of FIG. 2).

The operations performed at 1004-1020 may generally correspond to the same or similar operations as those discussed at 904-922 of FIG. 9, and will not be discussed again for brevity.

At 1022, the orchestrator 1023 may identify one or more dependencies associated with service 1002. A DAG associated with the service 1002 may be obtained (e.g., generated or retrieved from memory). One or more nodes of the DAG may correspond to one or more dependencies. As a non-limiting example, the DAG for service 1002 (or portion of the DAG associated with service 1002) may indicate that service 1002 depends on another service (e.g., service B).

That is, a node within the DAG corresponding to service B may be provided before a node corresponding to service 1002.

In accordance with identifying the dependency on service B, the orchestrator 1023 may execute any suitable operations for deploying/bootstrapping service B at 1024. At 1026, once service B has been bootstrapped (e.g., an predefined image for the service B is deployed to a particular computer within the environment/region) and is ready to accept subsequent requests, the orchestrator 1023 may transmit data (e.g., an IP address associated with the service B, an alphanumeric identifier associated with the service B, etc.) to the gateway computer 1008 to update the routing table maintained by the gateway computer 1008. The gateway computer 1008 may be configured to update the routing table with any suitable portion of the data provided by the orchestrator 1023 and associated with the service B. In some embodiments, the gateway computer 1008 may transmit any suitable data to the user device 1006 to indicate the service B is ready. The user device 1006 may present the status upon receipt (depicted at 1020).

At 1028, the orchestrator 516 may identify that service B has been deployed and may proceed to execute any suitable operations for deploying/bootstrapping the service 1002. At 1026, once service 1002 has been bootstrapped (e.g., an predefined image for the service 1002 is deployed to a particular computer within the environment/region) and is ready to accept subsequent requests, the orchestrator 1023 may transmit data (e.g., an IP address associated with the service 1002, an alphanumeric identifier associated with the service 1002, etc.) to the gateway computer 1008 to update the routing table maintained by the gateway computer 1008. The gateway computer 1008 may be configured to update the routing table with any suitable portion of the data provided by the orchestrator 1023 and associated with the service 1002. In some embodiments, the gateway computer 1008 may transmit any suitable data to the user device 1006 to indicate the service 1002 is ready. The user device 1006 may present the status upon receipt (depicted at 1020). The operations described at 1024 and/or 1028 may be repeated any suitable number of times depending on how many dependencies service 1002 has on other capabilities/services in the system.

Subsequently, a user may initiate a new API call at 1030 to initiate an API call/response to the service 1002. Now that the routing table includes the data associated with the service 1002 (e.g., the identifier for the service, an IP address for the service 1002, etc.), the gateway computer 1008 may route the API call to the service 1002 at 1032. At 1034, the service 1002 may receive and process the API call and then return a response to the gateway computer 1008, which in turn may forward the response to the user device 1006. This response may indicate whether the processing was successful (e.g., completed) or unsuccessful (e.g., incomplete/not allowed). The user device 1006 may receive the response and execute any suitable operations such as, but not limited to, displaying for the user an indication that the API call was successfully processed.

Figure 11:
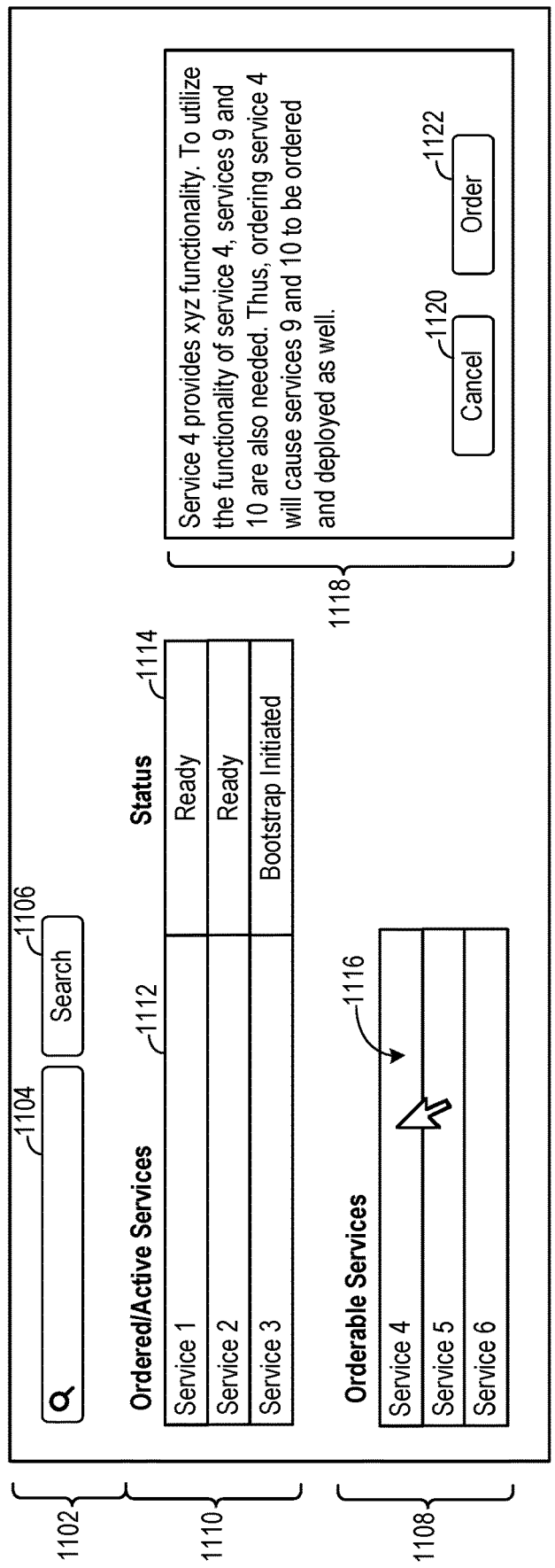
FIG. 11 is an example user interface for, among other things, initiating the operations discussed above, in accordance with at least one embodiment.

FIG. 11 is an example user interface 1100 for, among other things, initiating the operations discussed above, in accordance with at least one embodiment. In some embodiments, the user interface 1100 may be hosted by the gateway computers discussed in connection with the figures above or any suitable computer of the cloud-computing environment. If hosted by another computer, that computer may be configured to render user interface 1100 at the user device and transmit API calls to the gateway computers of the FIGS. 9 and 10. If the user interface 1100 is hosted by another computer different from the gateway computers, this computer may be configured to receive any suitable error codes, status values, or the like from the gateway computer and present status information corresponding to that data at the user interface 1100.

The user interface 1100 may include a search area 1102 that includes a search box 1104 and button 1106. The user may utilize the search box 1104 to enter a search query (e.g., some portion of a service identifier). When the button 1106 is selected, a search query may be executed using the input provided at the search box 1104. The search query may be executed against a database of orderable services to determine one or more services that match the query. In some embodiments, services that have previously been ordered and/or are currently active may be filtered from the list of search results. In some embodiments, the user may be presented (e.g., via user interface 1100 or another user interface) the list of search results from which the user may select one or more services to order. The search result list may look similar to the list of orderable services 1108 discussed below and may provide similar functionality via selections provided via the list as those discussed below.

The user interface 1100 may include a status area 1110. Status area 1110 may identify any suitable number of services, which are currently active, previously ordered, or winding down. In some embodiments, the status area 1110 may include identifiers for each service within column 1112 and a corresponding status for each service within column 1114. The status values may be numerous and vary based on the granularity of status that is desired. Some example status values could include "Ready," "Ordered," "Bootstrap Initiated," and "Spinning Down." In some embodiments, a menu or option for requesting that one or more services are spun down. This menu or option, although not depicted in FIG. 11, may be provided upon selecting one or more services within service area 1110 or this menu/option may be otherwise provided via user interface 1100 or any suitable interface. The gateway computers of the figures discussed above may be configured to provide status of the service at any suitable time, not necessarily only at the times and triggers discussed above. Thus, the gateway computer may provide status immediately after an order is received to display "ordered" at the column 1114 on a line corresponding to the service ordered. When the orchestrator initiates the bootstrap of the service (or when the gateway computer transmits the bootstrap request), the gateway computer may provide status to the user device which may be presented at the user interface 1100 within column 1114 as "Bootstrap Initiated." When the gateway computer (or any suitable computing component) determines that a service is to be spun down as discussed in connection with FIG. 7, a status value for the service may be provided and presented at the user interface 1100 as "Spinning Down" or "Deactivating." When a service is no longer active, it may be placed back in the set of orderable services depending on a predefined set of rules for identifying when a service is to be orderable. If orderable, the service may be removed from the status area 1110 and added to the list of orderable services 1108.

The list of orderable services 1108 may include any suitable number of services. A set of predefined rules may dictate when a service is to be made available for order, and thus, when the service will appear in the list of orderable services 1108. In some embodiments, the particular services that are orderable may depend on a number of factors such as the type of service, the service identifier associated with the service, the particular user and/or permissions associated with the user, and the like. The user may select any service within the list of orderable services. In some embodiments, when the user selects area 1116 (e.g., left clicks within area 1116), for example, description area 1118 may be presented. In some embodiments, description area 1118 may present a predefined description of the service. This description may describe functionality of the service and/or various dependencies associated with the service such that the user may be informed of other services and/or resources on which the selected service depends. Description area 1118 may include an order button 1120 and a cancel button 1122. Upon selection of the order button 1120, an API call corresponding to ordering a service may be transmitted in a similar manner as described above at 904 and 1004 of FIGS. 9 and 10. If the user decides he does not wish to order the selected service, he may select cancel button 1122 to cause the description area 1118 for the selected service to be removed.

Figure 12:
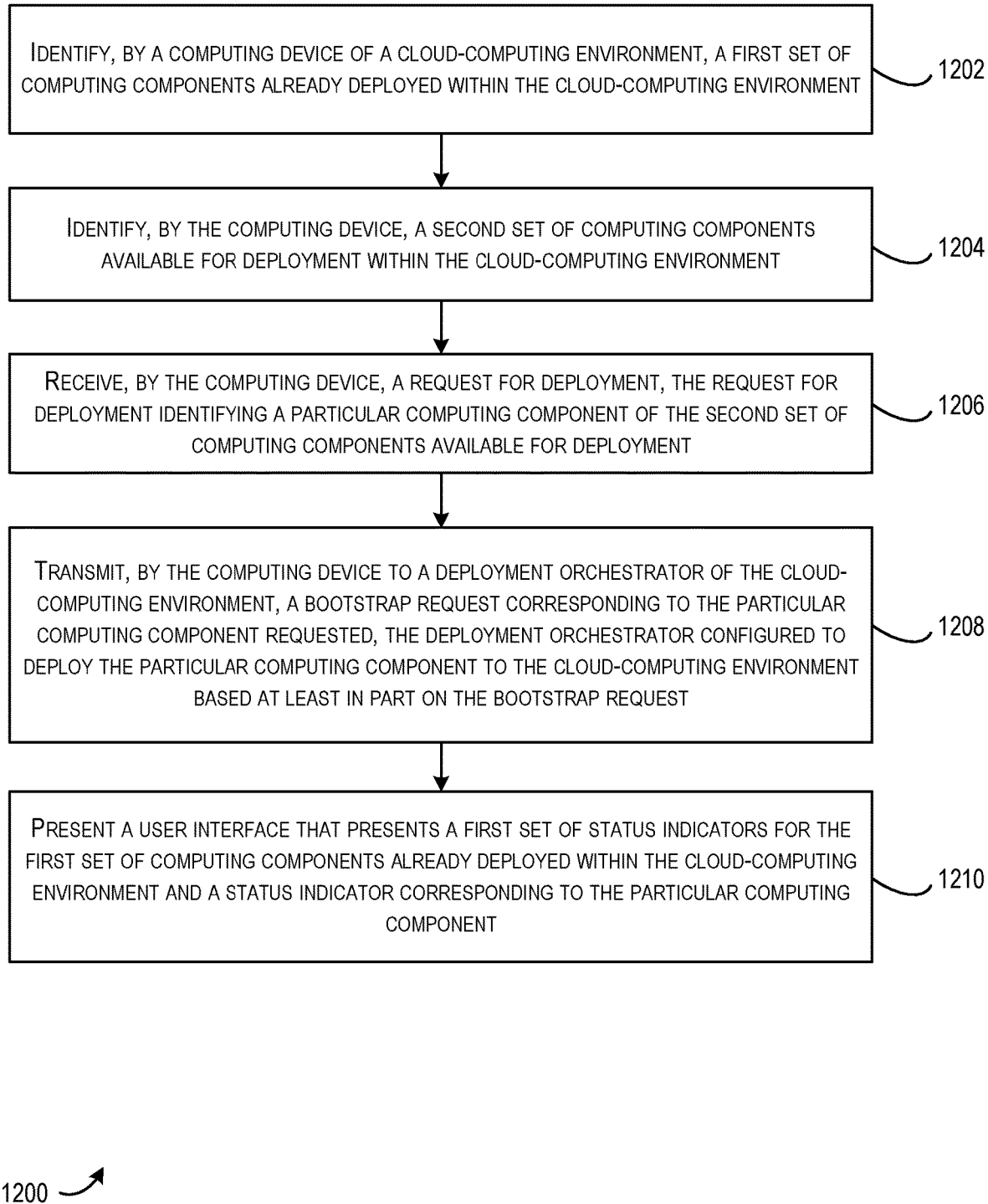
FIG. 12 is a flow diagram illustrating an example process for orchestrating the bootstrapping of a resource in response to receiving an order request for the resource, in accordance with at least one embodiment.

FIG. 12 illustrates an example flow diagram showing a method 1200 for performing operations for booting a resource of a cloud-computing system, according to certain embodiments of the present disclosure. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, the method 1200 may be performed under the control of one or more computing devices or computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. In some embodiments, the method 1200 may be performed by a plurality of processors in parallel. The computer-readable storage medium may be non-transitory. In some embodiments, the method 1200 is performed by a computing device (e.g., the gateway computers of FIGS. 9 and 10).

The method 1200 may begin at block 1202, where a first set of computing components already deployed within the cloud-computing environment may be identified by the computing device of the cloud-computing environment. By way of example, a request message may be transmitted to the orchestrator (e.g., orchestrator 1023 of FIG. 10) requesting a list of all services already deployed in the cloud-computing environment (and associated with the user). Data provided in the request may include an identifier for the user, user credentials, or the like. The orchestrator may be configured to compile this list (potentially based at least in part on the data provided in the request) and transmit a list of ordered or active services back to the computing device, which may configured to cause the presentation of this information at the status area 1110 of FIG. 11. For example, the computing device may transmit (directly, or thorough a computing device configured to host the user interface 1100) to a user device one or more status indicators corresponding to the list of ordered or active services. Upon receipt, the user device may be configured to present this list within status area 1110 of FIG. 11.

At 1204, a second set of computing components available for deployment within the cloud-computing environment may be identified by the computing device. By way of example, a request message may be transmitted to the orchestrator (e.g., orchestrator 1023 of FIG. 10) requesting a list of all services that are available for order. Data provided in the request may include an identifier for the user, user credentials, or the like. The orchestrator may be configured to compile this list (potentially based at least in part on the data provided in the request) and transmit a list of orderable services back to the computing device which may configured to cause the presentation of this information within area 1108 of FIG. 11. For example, the computing device may transmit (directly, or thorough a computing device configured to host the user interface 1100) a list of orderable services. Upon receipt, the user device may be configured to present this list within area 1108 of FIG. 11.

At 1206, a request for deployment may be received. By way of example, the user may make a selection (e.g., of service 4) from a user interface (e.g., user interface 1100 of FIG. 11). The selection may result into an API call being transmitted from the user device to the gateway computer (directly, or through a computing device configured to host the user interface) to order the service. The request for deployment (also referred to as an order request) may identify a particular computing component of the second set of computing components available for deployment (e.g., service 4 of FIG. 11, an example of services 902 and 1002 of FIGS. 9 and 10, respectively).

At 1208, a bootstrap request corresponding to the particular computing component requested may be transmitted, by the computing device to a deployment orchestrator of the cloud-computing environment (e.g., the orchestrators 916 and 1023 of FIGS. 9 and 10, respectively). In some embodiments, the deployment orchestrator may be configured to deploy the particular computing component to the cloud-computing environment based at least in part on the bootstrap request. Thus, the deployment orchestrator may deploy the requested computing component in response to the bootstrap request.

At 1210, a user interface (e.g., user interface 1100) that presents a first set of status indicators for the first set of computing components already deployed within the cloud-computing environment and a status indicator corresponding to the particular computing component may be presented (e.g., at the user device).

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 13:
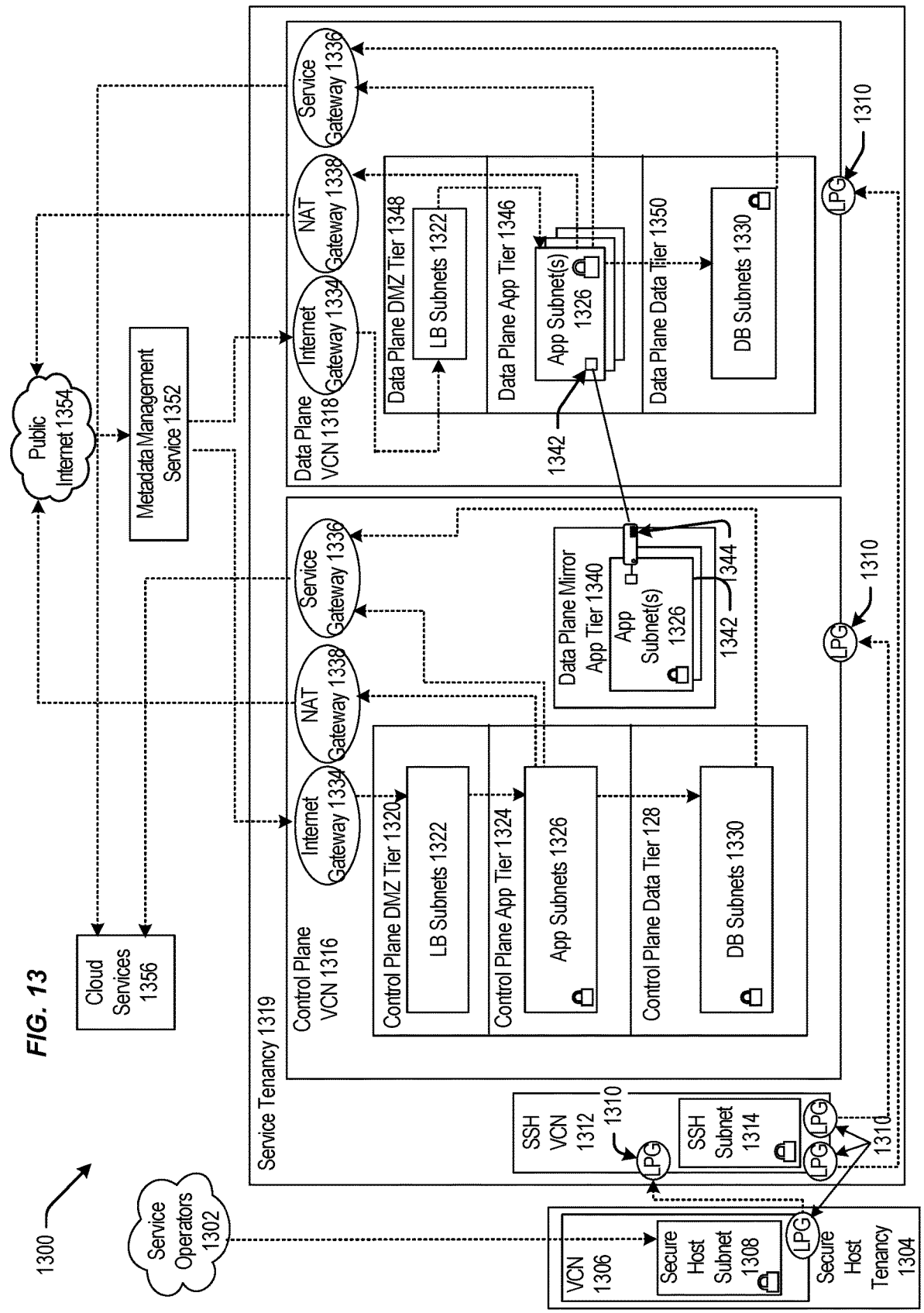
FIG. 13 is a block diagram illustrating one pattern for implementing a cloud infrastructure as a service system, according to at least one embodiment.

FIG. 13 is a block diagram 1300 illustrating an example pattern of an IaaS architecture, according to at least one embodiment. Service operators 1302 can be communicatively coupled to a secure host tenancy 1304 that can include a virtual cloud network (VCN) 1306 and a secure host subnet 1308. In some examples, the service operators 1302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1306 and/or the Internet.

The VCN 1306 can include a local peering gateway (LPG) 1310 that can be communicatively coupled to a secure shell (SSH) VCN 1312 via an LPG 1310 contained in the SSH VCN 1312. The SSH VCN 1312 can include an SSH subnet 1314, and the SSH VCN 1312 can be communicatively coupled to a control plane VCN 1316 via the LPG 1310 contained in the control plane VCN 1316. Also, the SSH VCN 1312 can be communicatively coupled to a data plane VCN 1318 via an LPG 1310. The control plane VCN 1316 and the data plane VCN 1318 can be contained in a service tenancy 1319 that can be owned and/or operated by the IaaS provider.

The control plane VCN 1316 can include a control plane demilitarized zone (DMZ) tier 1320 that acts as a perimeter network (e.g., portions of a corporate network between the corporate intranet and external networks). The DMZ-based servers may have restricted responsibilities and help keep breaches contained. Additionally, the DMZ tier 1320 can include one or more load balancer (LB) subnet(s) 1322, a control plane app tier 1324 that can include app subnet(s) 1326, a control plane data tier 1328 that can include database (DB) subnet(s) 1330 (e.g., frontend DB subnet(s) and/or backend DB subnet(s)). The LB subnet(s) 1322 contained in the control plane DMZ tier 1320 can be communicatively coupled to the app subnet(s) 1326 contained in the control plane app tier 1324 and an Internet gateway 1334 that can be contained in the control plane VCN 1316, and the app subnet(s) 1326 can be communicatively coupled to the DB subnet(s) 1330 contained in the control plane data tier 1328 and a service gateway 1336 and a network address translation (NAT) gateway 1338. The control plane VCN 1316 can include the service gateway 1336 and the NAT gateway 1338.

The control plane VCN 1316 can include a data plane mirror app tier 1340 that can include app subnet(s) 1326. The app subnet(s) 1326 contained in the data plane mirror app tier 1340 can include a virtual network interface controller (VNIC) 1342 that can execute a compute instance 1344. The compute instance 1344 can communicatively couple the app subnet(s) 1326 of the data plane mirror app tier 1340 to app subnet(s) 1326 that can be contained in a data plane app tier 1346.

The data plane VCN 1318 can include the data plane app tier 1346, a data plane DMZ tier 1348, and a data plane data tier 1350. The data plane DMZ tier 1348 can include LB subnet(s) 1322 that can be communicatively coupled to the app subnet(s) 1326 of the data plane app tier 1346 and the Internet gateway 1334 of the data plane VCN 1318. The app subnet(s) 1326 can be communicatively coupled to the service gateway 1336 of the data plane VCN 1318 and the NAT gateway 1338 of the data plane VCN 1318. The data plane data tier 1350 can also include the DB subnet(s) 1330 that can be communicatively coupled to the app subnet(s) 1326 of the data plane app tier 1346.

The Internet gateway 1334 of the control plane VCN 1316 and of the data plane VCN 1318 can be communicatively coupled to a metadata management service 1352 that can be communicatively coupled to public Internet 1354. Public Internet 1354 can be communicatively coupled to the NAT gateway 1338 of the control plane VCN 1316 and of the data plane VCN 1318. The service gateway 1336 of the control plane VCN 1316 and of the data plane VCN 1318 can be communicatively couple to cloud services 1356.

In some examples, the service gateway 1336 of the control plane VCN 1316 or of the data plane VCN 1318 can make application programming interface (API) calls to cloud services 1356 without going through public Internet 1354. The API calls to cloud services 1356 from the service gateway 1336 can be one-way: the service gateway 1336 can make API calls to cloud services 1356, and cloud services 1356 can send requested data to the service gateway 1336. But, cloud services 1356 may not initiate API calls to the service gateway 1336.

In some examples, the secure host tenancy 1304 can be directly connected to the service tenancy 1319, which may be otherwise isolated. The secure host subnet 1308 can communicate with the SSH subnet 1314 through an LPG 1310 that may enable two-way communication over an otherwise isolated system. Connecting the secure host subnet 1308 to the SSH subnet 1314 may give the secure host subnet 1308 access to other entities within the service tenancy 1319.

The control plane VCN 1316 may allow users of the service tenancy 1319 to set up or otherwise provision desired resources. Desired resources provisioned in the control plane VCN 1316 may be deployed or otherwise used in the data plane VCN 1318. In some examples, the control plane VCN 1316 can be isolated from the data plane VCN 1318, and the data plane mirror app tier 1340 of the control plane VCN 1316 can communicate with the data plane app tier 1346 of the data plane VCN 1318 via VNICs 1342 that can be contained in the data plane mirror app tier 1340 and the data plane app tier 1346.

In some examples, users of the system, or customers, can make requests, for example create, read, update, or delete (CRUD) operations, through public Internet 1354 that can communicate the requests to the metadata management service 1352. The metadata management service 1352 can communicate the request to the control plane VCN 1316 through the Internet gateway 1334. The request can be received by the LB subnet(s) 1322 contained in the control plane DMZ tier 1320. The LB subnet(s) 1322 may determine that the request is valid, and in response to this determination, the LB subnet(s) 1322 can transmit the request to app subnet(s) 1326 contained in the control plane app tier 1324. If the request is validated and requires a call to public Internet 1354, the call to public Internet 1354 may be transmitted to the NAT gateway 1338 that can make the call to public Internet 1354. Memory that may be desired to be stored by the request can be stored in the DB subnet(s) 1330.

In some examples, the data plane mirror app tier 1340 can facilitate direct communication between the control plane VCN 1316 and the data plane VCN 1318. For example, changes, updates, or other suitable modifications to configuration may be desired to be applied to the resources contained in the data plane VCN 1318. Via a VNIC 1342, the control plane VCN 1316 can directly communicate with, and can thereby execute the changes, updates, or other suitable modifications to configuration to, resources contained in the data plane VCN 1318.

In some embodiments, the control plane VCN 1316 and the data plane VCN 1318 can be contained in the service tenancy 1319. In this case, the user, or the customer, of the system may not own or operate either the control plane VCN 1316 or the data plane VCN 1318. Instead, the IaaS provider may own or operate the control plane VCN 1316 and the data plane VCN 1318, both of which may be contained in the service tenancy 1319. This embodiment can enable isolation of networks that may prevent users or customers from interacting with other users', or other customers', resources. Also, this embodiment may allow users or customers of the system to store databases privately without needing to rely on public Internet 1354, which may not have a desired level of threat prevention, for storage.

In other embodiments, the LB subnet(s) 1322 contained in the control plane VCN 1316 can be configured to receive a signal from the service gateway 1336. In this embodiment, the control plane VCN 1316 and the data plane VCN 1318 may be configured to be called by a customer of the IaaS provider without calling public Internet 1354. Customers of the IaaS provider may desire this embodiment since database(s) that the customers use may be controlled by the IaaS provider and may be stored on the service tenancy 1319, which may be isolated from public Internet 1354.

Figure 14:
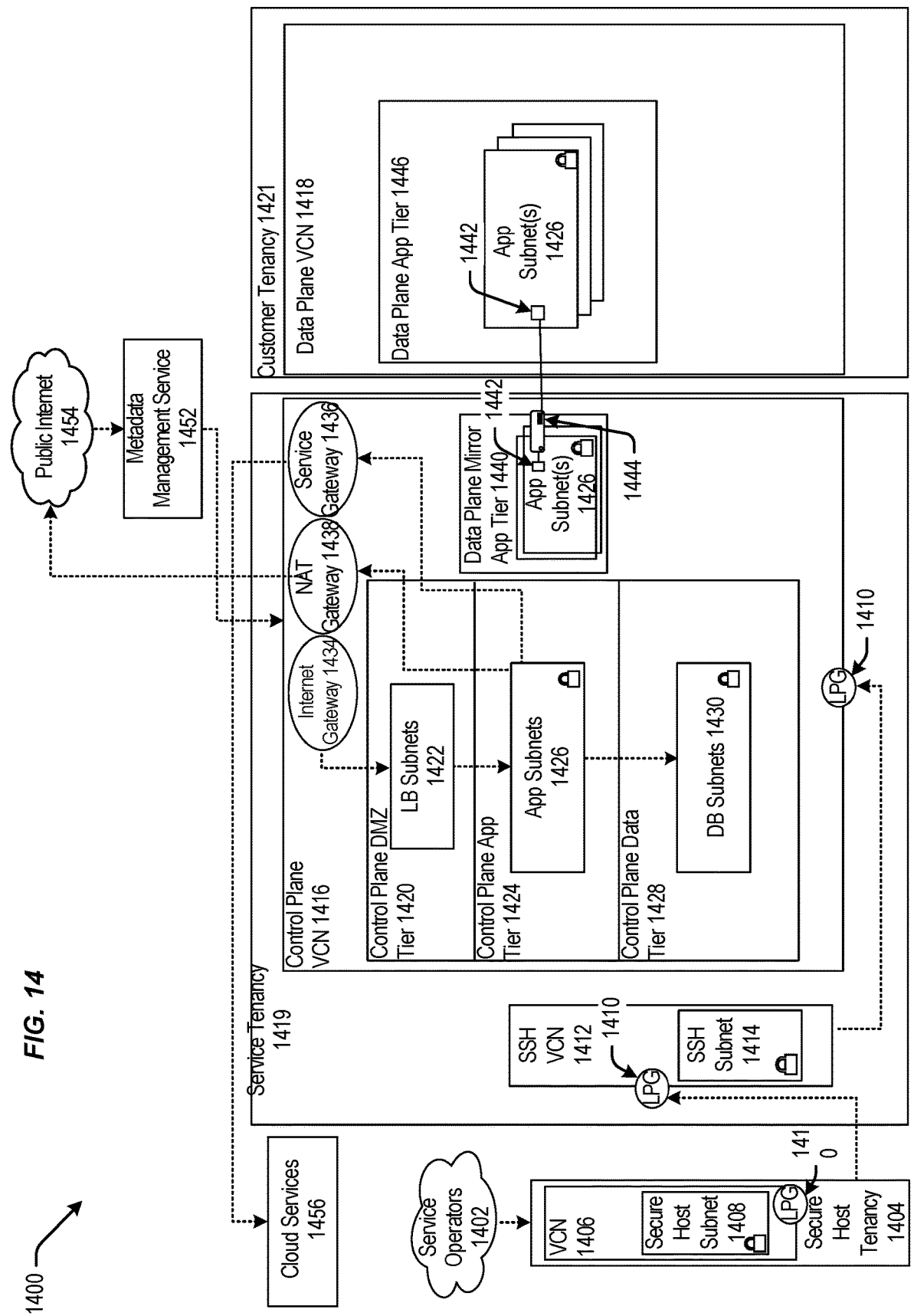
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1302 of FIG. 13) can be communicatively coupled to a secure host tenancy 1404 (e.g. the secure host tenancy 1304 of FIG. 13) that can include a virtual cloud network (VCN) 1406 (e.g. the VCN 1306 of FIG. 13) and a secure host subnet 1408 (e.g. the secure host subnet 1308 of FIG. 13). The VCN 1406 can include a local peering gateway (LPG) 1410 (e.g. the LPG 1310 of FIG. 13) that can be communicatively coupled to a secure shell (SSH) VCN 1412 (e.g. the SSH VCN 1312 of FIG. 13) via an LPG 1310 contained in the SSH VCN 1412. The SSH VCN 1412 can include an SSH subnet 1414 (e.g. the SSH subnet 1314 of FIG. 13), and the SSH VCN 1412 can be communicatively coupled to a control plane VCN 1416 (e.g. the control plane VCN 1316 of FIG. 13) via an LPG 1410 contained in the control plane VCN 1416. The control plane VCN 1416 can be contained in a service tenancy 1419 (e.g. the service tenancy 1319 of FIG. 13), and the data plane VCN 1418 (e.g. the data plane VCN 1318 of FIG. 13) can be contained in a customer tenancy 1421 that may be owned or operated by users, or customers, of the system.

The control plane VCN 1416 can include a control plane DMZ tier 1420 (e.g. the control plane DMZ tier 1320 of FIG. 13) that can include LB subnet(s) 1422 (e.g. LB subnet(s) 1322 of FIG. 13), a control plane app tier 1424 (e.g. the control plane app tier 1324 of FIG. 13) that can include app subnet(s) 1426 (e.g. app subnet(s) 1326 of FIG. 13), a control plane data tier 1428 (e.g. the control plane data tier 1328 of FIG. 13) that can include database (DB) subnet(s) 1430 (e.g. similar to DB subnet(s) 1330 of FIG. 13). The LB subnet(s) 1422 contained in the control plane DMZ tier 1420 can be communicatively coupled to the app subnet(s) 1426 contained in the control plane app tier 1424 and an Internet gateway 1434 (e.g. the Internet gateway 1334 of FIG. 13) that can be contained in the control plane VCN 1416, and the app subnet(s) 1426 can be communicatively coupled to the DB subnet(s) 1430 contained in the control plane data tier 1428 and a service gateway 1436 (e.g. the service gateway of FIG. 13) and a network address translation (NAT) gateway 1438 (e.g. the NAT gateway 1338 of FIG. 13). The control plane VCN 1416 can include the service gateway 1436 and the NAT gateway 1438.

The control plane VCN 1416 can include a data plane mirror app tier 1440 (e.g. the data plane mirror app tier 1340 of FIG. 13) that can include app subnet(s) 1426. The app subnet(s) 1426 contained in the data plane mirror app tier 1440 can include a virtual network interface controller (VNIC) 1442 (e.g. the VNIC of 1342) that can execute a compute instance 1444 (e.g. similar to the compute instance 1344 of FIG. 13). The compute instance 1444 can facilitate communication between the app subnet(s) 1426 of the data plane mirror app tier 1440 and the app subnet(s) 1426 that can be contained in a data plane app tier 1446 (e.g. the data plane app tier 1346 of FIG. 13) via the VNIC 1442 contained in the data plane mirror app tier 1440 and the VNIC 1442 contained in the data plane app tier 1446.

The Internet gateway 1434 contained in the control plane VCN 1416 can be communicatively coupled to a metadata management service 1452 (e.g. the metadata management service 1352 of FIG. 13) that can be communicatively coupled to public Internet 1454 (e.g. public Internet 1354 of FIG. 13). Public Internet 1454 can be communicatively coupled to the NAT gateway 1438 contained in the control plane VCN 1416. The service gateway 1436 contained in the control plane VCN 1416 can be communicatively couple to cloud services 1456 (e.g. cloud services 1356 of FIG. 13).

In some examples, the data plane VCN 1418 can be contained in the customer tenancy 1421. In this case, the IaaS provider may provide the control plane VCN 1416 for each customer, and the IaaS provider may, for each customer, set up a unique compute instance 1444 that is contained in the service tenancy 1419. Each compute instance 1444 may allow communication between the control plane VCN 1416, contained in the service tenancy 1419, and the data plane VCN 1418 that is contained in the customer tenancy 1421. The compute instance 1444 may allow resources, that are provisioned in the control plane VCN 1416 that is contained in the service tenancy 1419, to be deployed or otherwise used in the data plane VCN 1418 that is contained in the customer tenancy 1421.

In other examples, the customer of the IaaS provider may have databases that live in the customer tenancy 1421. In this example, the control plane VCN 1416 can include the data plane mirror app tier 1440 that can include app subnet(s) 1426. The data plane mirror app tier 1440 can reside in the data plane VCN 1418, but the data plane mirror app tier 1440 may not live in the data plane VCN 1418. That is, the data plane mirror app tier 1440 may have access to the customer tenancy 1421, but the data plane mirror app tier 1440 may not exist in the data plane VCN 1418 or be owned or operated by the customer of the IaaS provider. The data plane mirror app tier 1440 may be configured to make calls to the data plane VCN 1418 but may not be configured to make calls to any entity contained in the control plane VCN 1416. The customer may desire to deploy or otherwise use resources in the data plane VCN 1418 that are provisioned in the control plane VCN 1416, and the data plane mirror app tier 1440 can facilitate the desired deployment, or other usage of resources, of the customer.

In some embodiments, the customer of the IaaS provider can apply filters to the data plane VCN 1418. In this embodiment, the customer can determine what the data plane VCN 1418 can access, and the customer may restrict access to public Internet 1454 from the data plane VCN 1418. The IaaS provider may not be able to apply filters or otherwise control access of the data plane VCN 1418 to any outside networks or databases. Applying filters and controls by the customer onto the data plane VCN 1418, contained in the customer tenancy 1421, can help isolate the data plane VCN 1418 from other customers and from public Internet 1454.

In some embodiments, cloud services 1456 can be called by the service gateway 1436 to access services that may not exist on public Internet 1454, on the control plane VCN 1416, or on the data plane VCN 1418. The connection between cloud services 1456 and the control plane VCN 1416 or the data plane VCN 1418 may not be live or continuous. Cloud services 1456 may exist on a different network owned or operated by the IaaS provider. Cloud services 1456 may be configured to receive calls from the service gateway 1436 and may be configured to not receive calls from public Internet 1454. Some cloud services 1456 may be isolated from other cloud services 1456, and the control plane VCN 1416 may be isolated from cloud services 1456 that may not be in the same region as the control plane VCN 1416. For example, the control plane VCN 1416 may be located in "Region 1," and cloud service "Deployment 13," may be located in Region 1 and in "Region 2." If a call to Deployment 13 is made by the service gateway 1436 contained in the control plane VCN 1416 located in Region 1, the call may be transmitted to Deployment 13 in Region 1. In this example, the control plane VCN 1416, or Deployment 13 in Region 1, may not be communicatively coupled to, or otherwise in communication with, Deployment 13 in Region 2.

Figure 15:
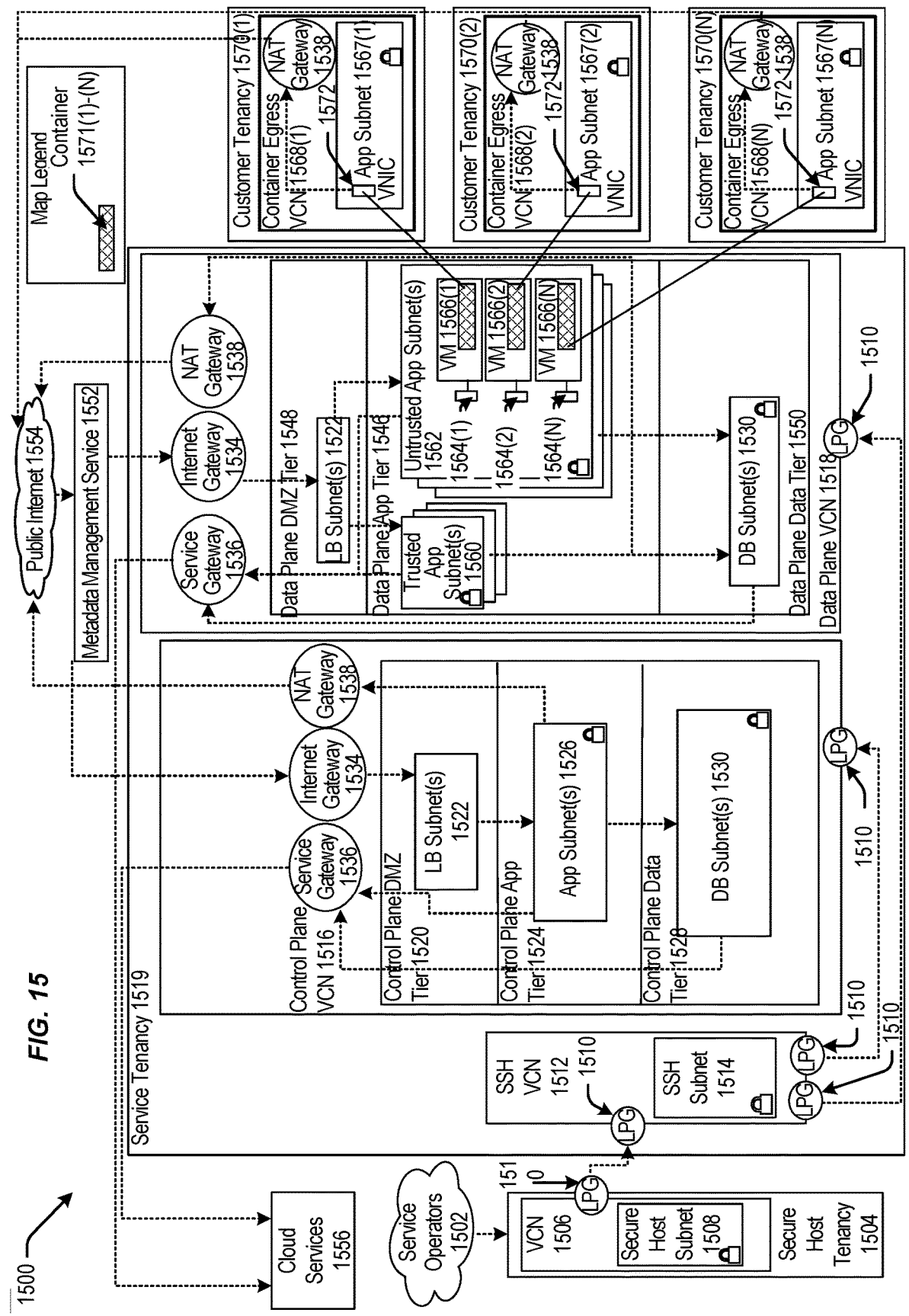
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g. service operators 1302 of FIG. 13) can be communicatively coupled to a secure host tenancy 1504 (e.g. the secure host tenancy 1304 of FIG. 13) that can include a virtual cloud network (VCN) 1506 (e.g. the VCN 1306 of FIG. 13) and a secure host subnet 1508 (e.g. the secure host subnet 1308 of FIG. 13). The VCN 1506 can include an LPG 1510 (e.g. the LPG 1310 of FIG. 13) that can be communicatively coupled to an SSH VCN 1512 (e.g. the SSH VCN 1312 of FIG. 13) via an LPG 1510 contained in the SSH VCN 1512. The SSH VCN 1512 can include an SSH subnet 1514 (e.g. the SSH subnet 1314 of FIG. 13), and the SSH VCN 1512 can be communicatively coupled to a control plane VCN 1516 (e.g. the control plane VCN 1316 of FIG. 13) via an LPG 1510 contained in the control plane VCN 1516 and to a data plane VCN 1518 (e.g. the data plane 1318 of FIG. 13) via an LPG 1510 contained in the data plane VCN 1518. The control plane VCN 1516 and the data plane VCN 1518 can be contained in a service tenancy 1519 (e.g. the service tenancy 1319 of FIG. 13).

The control plane VCN 1516 can include a control plane DMZ tier 1520 (e.g. the control plane DMZ tier 1320 of FIG. 13) that can include load balancer (LB) subnet(s) 1522 (e.g. LB subnet(s) 1322 of FIG. 13), a control plane app tier 1524 (e.g. the control plane app tier 1324 of FIG. 13) that can include app subnet(s) 1526 (e.g. similar to app subnet(s) 1326 of FIG. 13), a control plane data tier 1528 (e.g. the control plane data tier 1328 of FIG. 13) that can include DB subnet(s) 1530. The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1334 of FIG. 13) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 13) and a network address translation (NAT) gateway 1538 (e.g. the NAT gateway 1338 of FIG. 13). The control plane VCN 1516 can include the service gateway 1536 and the NAT gateway 1538.

The data plane VCN 1518 can include a data plane app tier 1546 (e.g. the data plane app tier 1346 of FIG. 13), a data plane DMZ tier 1548 (e.g. the data plane DMZ tier 1348 of FIG. 13), and a data plane data tier 1550 (e.g. the data plane data tier 1350 of FIG. 13). The data plane DMZ tier 1548 can include LB subnet(s) 1522 that can be communicatively coupled to trusted app subnet(s) 1560 and untrusted app subnet(s) 1562 of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include one or more primary VNICs 1564(1)-(N) that can be communicatively coupled to tenant virtual machines (VMs) 1566(1)-(N). Each tenant VM 1566(1)-(N) can be communicatively coupled to a respective app subnet 1567(1)-(N) that can be contained in respective container egress VCNs 1568(1)-(N) that can be contained in respective customer tenancies 1570(1)-(N). Respective secondary VNICs 1572(1)-(N) can facilitate communication between the untrusted app subnet(s) 1562 contained in the data plane VCN 1518 and the app subnet contained in the container egress VCNs 1568(1)-(N). Each container egress VCNs 1568(1)-(N) can include a NAT gateway 1538 that can be communicatively coupled to public Internet 1554 (e.g. public Internet 1354 of FIG. 13).

The Internet gateway 1534 contained in the control plane VCN 1516 and contained in the data plane VCN 1518 can be communicatively coupled to a metadata management service 1552 (e.g. the metadata management system 1352 of FIG. 13) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some embodiments, the data plane VCN 1518 can be integrated with customer tenancies 1570. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1546. Code to run the function may be executed in the VMs 1566(1)-(N), and the code may not be configured to run anywhere else on the data plane VCN 1518. Each VM 1566(1)-(N) may be connected to one customer tenancy 1570. Respective containers 1571(1)-(N) contained in the VMs 1566(1)-(N) may be configured to run the code. In this case, there can be a dual isolation (e.g., the containers 1571(1)-(N) running code, where the containers 1571(1)-(N) may be contained in at least the VM 1566(1)-(N) that are contained in the untrusted app subnet(s) 1562), which may help prevent incorrect or otherwise undesirable code from damaging the network of the IaaS provider or from damaging a network of a different customer. The containers 1571(1)-(N) may be communicatively coupled to the customer tenancy 1570 and may be configured to transmit or receive data from the customer tenancy 1570. The containers 1571(1)-(N) may not be configured to transmit or receive data from any other entity in the data plane VCN 1518. Upon completion of running the code, the IaaS provider may kill or otherwise dispose of the containers 1571(1)-(N).

In some embodiments, the trusted app subnet(s) 1560 may run code that may be owned or operated by the IaaS provider. In this embodiment, the trusted app subnet(s) 1560 may be communicatively coupled to the DB subnet(s) 1530 and be configured to execute CRUD operations in the DB subnet(s) 1530. The untrusted app subnet(s) 1562 may be communicatively coupled to the DB subnet(s) 1530, but in this embodiment, the untrusted app subnet(s) may be configured to execute read operations in the DB subnet(s) 1530. The containers 1571(1)-(N) that can be contained in the VM 1566(1)-(N) of each customer and that may run code from the customer may not be communicatively coupled with the DB subnet(s) 1530.

In other embodiments, the control plane VCN 1516 and the data plane VCN 1518 may not be directly communicatively coupled. In this embodiment, there may be no direct communication between the control plane VCN 1516 and the data plane VCN 1518. However, communication can occur indirectly through at least one method. An LPG 1510 may be established by the IaaS provider that can facilitate communication between the control plane VCN 1516 and the data plane VCN 1518. In another example, the control plane VCN 1516 or the data plane VCN 1518 can make a call to cloud services 1556 via the service gateway 1536. For example, a call to cloud services 1556 from the control plane VCN 1516 can include a request for a service that can communicate with the data plane VCN 1518.

Figure 16:
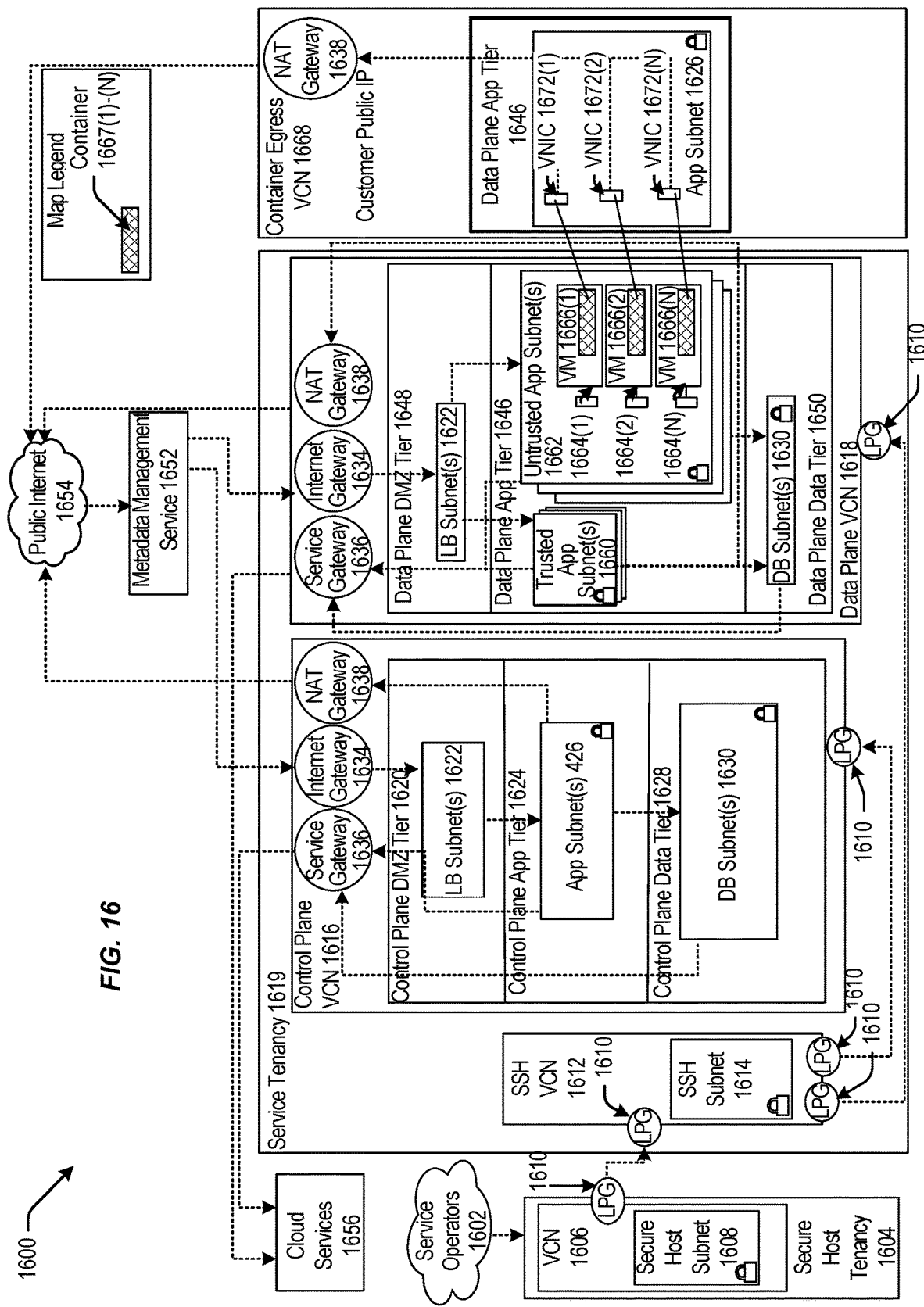
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g. service operators 1302 of FIG. 13) can be communicatively coupled to a secure host tenancy 1604 (e.g. the secure host tenancy 1304 of FIG. 13) that can include a virtual cloud network (VCN) 1606 (e.g. the VCN 1306 of FIG. 13) and a secure host subnet 1608 (e.g. the secure host subnet 1308 of FIG. 13). The VCN 1606 can include an LPG 1610 (e.g. the LPG 1310 of FIG. 13) that can be communicatively coupled to an SSH VCN 1612 (e.g. the SSH VCN 1312 of FIG. 13) via an LPG 1610 contained in the SSH VCN 1612. The SSH VCN 1612 can include an SSH subnet 1614 (e.g. the SSH subnet 1314 of FIG. 13), and the SSH VCN 1612 can be communicatively coupled to a control plane VCN 1616 (e.g. the control plane VCN 1316 of FIG. 13) via an LPG 1610 contained in the control plane VCN 1616 and to a data plane VCN 1618 (e.g. the data plane 1318 of FIG. 13) via an LPG 1610 contained in the data plane VCN 1618. The control plane VCN 1616 and the data plane VCN 1618 can be contained in a service tenancy 1619 (e.g. the service tenancy 1319 of FIG. 13).

The control plane VCN 1616 can include a control plane DMZ tier 1620 (e.g. the control plane DMZ tier 1320 of FIG. 13) that can include LB subnet(s) 1622 (e.g. LB subnet(s) 1322 of FIG. 13), a control plane app tier 1624 (e.g. the control plane app tier 1324 of FIG. 13) that can include app subnet(s) 1626 (e.g. app subnet(s) 1326 of FIG. 13), a control plane data tier 1628 (e.g. the control plane data tier 1328 of FIG. 13) that can include DB subnet(s) 1630 (e.g. DB subnet(s) 1530 of FIG. 15). The LB subnet(s) 1622 contained in the control plane DMZ tier 1620 can be communicatively coupled to the app subnet(s) 1626 contained in the control plane app tier 1624 and to an Internet gateway 1634 (e.g. the Internet gateway 1334 of FIG. 13) that can be contained in the control plane VCN 1616, and the app subnet(s) 1626 can be communicatively coupled to the DB subnet(s) 1630 contained in the control plane data tier 1628 and to a service gateway 1636 (e.g. the service gateway of FIG. 13) and a network address translation (NAT) gateway 1638 (e.g. the NAT gateway 1338 of FIG. 13). The control plane VCN 1616 can include the service gateway 1636 and the NAT gateway 1638.

The data plane VCN 1618 can include a data plane app tier 1646 (e.g. the data plane app tier 1346 of FIG. 13), a data plane DMZ tier 1648 (e.g. the data plane DMZ tier 1348 of FIG. 13), and a data plane data tier 1650 (e.g. the data plane data tier 1350 of FIG. 13). The data plane DMZ tier 1648 can include LB subnet(s) 1622 that can be communicatively coupled to trusted app subnet(s) 1660 (e.g. trusted app subnet(s) 1560 of FIG. 15) and untrusted app subnet(s) 1662 (e.g. untrusted app subnet(s) 1562 of FIG. 15) of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include primary VNICs 1664(1)-(N) that can be communicatively coupled to tenant virtual machines (VMs) 1666(1)-(N) residing within the untrusted app subnet(s) 1662. Each tenant VM 1666(1)-(N) can run code in a respective container 1667(1)-(N), and be communicatively coupled to an app subnet 1626 that can be contained in a data plane app tier 1646 that can be contained in a container egress VCN 1668. Respective secondary VNICs 1672(1)-(N) can facilitate communication between the untrusted app subnet(s) 1662 contained in the data plane VCN 1618 and the app subnet contained in the container egress VCN 1668. The container egress VCN can include a NAT gateway 1638 that can be communicatively coupled to public Internet 1654 (e.g. public Internet 1354 of FIG. 13).

The Internet gateway 1634 contained in the control plane VCN 1616 and contained in the data plane VCN 1618 can be communicatively coupled to a metadata management service 1652 (e.g. the metadata management system 1352 of FIG. 13) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some examples, the pattern illustrated by the architecture of block diagram 1600 of FIG. 16 may be considered an exception to the pattern illustrated by the architecture of block diagram 1500 of FIG. 15 and may be desirable for a customer of the IaaS provider if the IaaS provider cannot directly communicate with the customer (e.g., a disconnected region). The respective containers 1667(1)-(N) that are contained in the VMs 1666(1)-(N) for each customer can be accessed in real-time by the customer. The containers 1667(1)-(N) may be configured to make calls to respective secondary VNICs 1672(1)-(N) contained in app subnet(s) 1626 of the data plane app tier 1646 that can be contained in the container egress VCN 1668. The secondary VNICs 1672(1)-(N) can transmit the calls to the NAT gateway 1638 that may transmit the calls to public Internet 1654. In this example, the containers 1667(1)-(N) that can be accessed in real-time by the customer can be isolated from the control plane VCN 1616 and can be isolated from other entities contained in the data plane VCN 1618. The containers 1667(1)-(N) may also be isolated from resources from other customers.

In other examples, the customer can use the containers 1667(1)-(N) to call cloud services 1656. In this example, the customer may run code in the containers 1667(1)-(N) that requests a service from cloud services 1656. The containers 1667(1)-(N) can transmit this request to the secondary VNICs 1672(1)-(N) that can transmit the request to the NAT gateway that can transmit the request to public Internet 1654. Public Internet 1654 can transmit the request to LB subnet(s) 1622 contained in the control plane VCN 1616 via the Internet gateway 1634. In response to determining the request is valid, the LB subnet(s) can transmit the request to app subnet(s) 1626 that can transmit the request to cloud services 1656 via the service gateway 1636.

It should be appreciated that IaaS architectures 1300, 1400, 1500, 1600 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 17 illustrates an example computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that comprises software elements, shown as being currently located within a system memory 1710. System memory 1710 may store program instructions that are loadable and executable on processing unit 1704, as well as data generated during the execution of these programs.

Depending on the configuration and type of computer system 1700, system memory 1710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1704. In some implementations, system memory 1710 may include multiple different types of memory, such as static random access memory (SRAM) or dynamic random access memory (DRAM). In some implementations, a basic input/output system (BIOS), containing the basic routines that help to transfer information between elements within computer system 1700, such as during start-up, may typically be stored in the ROM. By way of example, and not limitation, system memory 1710 also illustrates application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 17 OS, and Palm® OS operating systems.

Storage subsystem 1718 may also provide a tangible computer-readable storage medium for storing the basic programming and data constructs that provide the functionality of some embodiments. Software (programs, code modules, instructions) that when executed by a processor provide the functionality described above may be stored in storage subsystem 1718. These software modules or instructions may be executed by processing unit 1704. Storage subsystem 1718 may also provide a repository for storing data used in accordance with the present disclosure.

Storage subsystem 1700 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for temporarily and/or more permanently containing, storing, transmitting, and retrieving computer-readable information.

Computer-readable storage media 1722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1700.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive. Thus, although specific disclosure embodiments have been described, these are not intended to be limiting. Various modifications and equivalents are within the scope of the following claims.

What is claimed is:

1. A computer-implemented method, comprising:
   receiving, by a computing device of a cloud-computing environment, a request comprising an identifier for a computing component of the cloud-computing environment;
   determining, by the computing device, whether the identifier exists in a routing table that is accessible to the computing device;
   in accordance with the identifier existing in the routing table, forward the request to the computing component;
   in accordance with the identifier being missing from the routing table:
     transmitting, by the computing device, an error code in response to the request, the error code indicating the computing component is unavailable; and
     transmitting, by the computing device to a deployment orchestrator of the cloud-computing environment, a bootstrap request corresponding to the computing component, the deployment orchestrator configured to deploy the computing component to the cloud-computing environment based at least in part on the bootstrap request;
   receiving a subsequent request comprising the identifier; and
   transmitting the subsequent request to the computing component for processing.

2. The computer-implemented method of claim 1, further comprising, in accordance with the identifier being missing from the routing table:
   presenting an indication that the computing component was successfully deployed; and
   updating the routing table with the identifier.

3. The computer-implemented method of claim 1, wherein the deployment orchestrator is configured to identify one or more computing components from which the computing component depends, and deploy the one or more computing components prior to deploying the computing component.

4. The computer-implemented method of claim 1, further comprising:
   setting a timer corresponding to the computing component, the timer being set to a predefined period of time;
   determining, based at least in part on the timer, that the computing component has not been called for at least the predefined period of time; and
   transmitting, by the computing device to the deployment orchestrator of the cloud-computing environment, a spin-down request corresponding to the computing component, whereby transmitting the spin-down request causes the deployment orchestrator to remove the computing component from the cloud-computing environment.

5. The computer-implemented method of claim 4, wherein transmitting the spin-down request is further based at least in part on determining that no other component of the cloud-computing environment depends on the computing component.

6. The computer-implemented method of claim 4, further comprising requesting and receiving user input indicating approval to proceed with the spin-down request prior to transmitting the spin-down request.

7. The computer-implemented method of claim 1, further comprising:
   transmitting, to the deployment orchestrator, a spin-down request corresponding to the computing component, the spin-down request being transmitted in response to 1) receiving an additional request to spin down the computing component, or 2) identifying a last time at which a last request for the computing component was received and determining that a difference between the last time and a current time exceeds a predefined threshold period of time.

8. A computing device of a cloud-computing environment, comprising
   one or more processors; and
   one or more memories storing computer-executable instructions that, when executed by the one or more processors, causes the computing device to:
     receive a request comprising an identifier for a computing component of the cloud-computing environment;
     determine whether the identifier exists in a routing table that is accessible to the computing device;
     in accordance with the identifier existing in the routing table, forward the request to the computing component;
     in accordance with the identifier being missing from the routing table:

transmit an error code in response to the request, the error code indicating the computing component is unavailable; and transmit, to a deployment orchestrator of the cloud-computing environment, a bootstrap request corresponding to the computing component, the deployment orchestrator configured to deploy the computing component to the cloud-computing environment based at least in part on the bootstrap request;

receive a subsequent request comprising the identifier; and transmit the subsequent request to the computing component for processing.

9. The computing device of claim 8, wherein executing the instructions further cause the computing device to, in accordance with the identifier being missing from the routing table:

present an indication that the computing component was successfully deployed; and update the routing table with the identifier.

10. The computing device of claim 8, wherein the deployment orchestrator is configured to identify one or more computing components from which the computing component depends, and deploy the one or more computing components prior to deploying the computing component.

11. The computing device of claim 8, wherein executing the instructions further cause the computing device to:

set a timer corresponding to the computing component, the timer being set to a predefined period of time;

determine, based at least in part on the timer, that the computing component has not been called for at least the predefined period of time; and transmit, by the computing device to the deployment orchestrator of the cloud-computing environment, a spin-down request corresponding to the computing component, whereby transmitting the spin-down request causes the deployment orchestrator to remove the computing component from the cloud-computing environment.

12. The computing device of claim 11, wherein transmitting the spin-down request is further based at least in part on determining that no other component of the cloud-computing environment depends on the computing component.

13. The computing device of claim 11, wherein executing the instructions further causes the computing device to request user input indicating approval to proceed with the spin-down request prior to transmitting the spin-down request.

14. The computer-implemented method of claim 1, wherein executing the instructions further causes the computing device to:

transmit, to the deployment orchestrator, a spin-down request corresponding to the computing component, the spin-down request being transmitted in response to 1) receiving an additional request to spin down the computing component, or 2) identifying a last time at which a last request for the computing component was received and determining that a difference between the last time and a current time exceeds a predefined threshold period of time.

15. A non-transitory computer-readable storage medium, comprising computer-executable instructions that, when executed by one or more processors of a computing device, cause the computing device of a cloud-computing environment to:

receive a request comprising an identifier for a computing component of the cloud-computing environment;

determine whether the identifier exists in a routing table that is accessible to the computing device;

in accordance with the identifier existing in the routing table, forward the request to the computing component;

in accordance with the identifier being missing from the routing table:

transmit an error code in response to the request, the error code indicating the computing component is unavailable; and transmit, to a deployment orchestrator of the cloud-computing environment, a bootstrap request corresponding to the computing component, the deployment orchestrator configured to deploy the computing component to the cloud-computing environment based at least in part on the bootstrap request;

receive a subsequent request comprising the identifier; and transmit the subsequent request to the computing component for processing.

16. The non-transitory computer-readable storage medium of claim 15, wherein executing the instructions further causes the computing device to, in accordance with the identifier being missing from the routing table:

present an indication that the computing component was successfully deployed; and update the routing table with the identifier.

17. The non-transitory computer-readable storage medium of claim 15, wherein the deployment orchestrator is configured to identify one or more computing components from which the computing component depends, and deploy the one or more computing components prior to deploying the computing component.

18. The non-transitory computer-readable storage medium of claim 15, wherein executing the instructions further causes the computing device to:

set a timer corresponding to the computing component, the timer being set to a predefined period of time;

determine, based at least in part on the timer, that the computing component has not been called for at least the predefined period of time; and transmit, by the computing device to the deployment orchestrator of the cloud-computing environment, a spin-down request corresponding to the computing component, whereby transmitting the spin-down request causes the deployment orchestrator to remove the computing component from the cloud-computing environment.

19. The non-transitory computer-readable storage medium of claim 18, wherein transmitting the spin-down request is further based at least in part on determining that no other component of the cloud-computing environment depends on the computing component.

20. The non-transitory computer-readable storage medium of claim 15, wherein executing the instructions further causes the computing device to:

transmit, to the deployment orchestrator, a spin-down request corresponding to the computing component, the spin-down request being transmitted in response to 1) receiving an additional request to spin down the computing component, or 2) identifying a last time at which a last request for the computing component was received and determining that a difference between the last time and a current time exceeds a predefined threshold period of time.

* * * * *